(12) United States Patent
Li et al.

(10) Patent No.: US 12,010,429 B2
(45) Date of Patent: Jun. 11, 2024

(54) CAMERA MODULE AND MOBILE TERMINAL

(71) Applicant: HUAWEI TECHNOLOGIES CO., LTD., Shenzhen (CN)

(72) Inventors: Liang Li, Dongguan (CN); Qianyan Fu, Shenzhen (CN); Zhiguo Yan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 17/690,791

(22) Filed: Mar. 9, 2022

(65) Prior Publication Data

US 2022/0201218 A1  Jun. 23, 2022

Related U.S. Application Data

(63) Continuation of application No. PCT/CN2020/114767, filed on Sep. 11, 2020.

(30) Foreign Application Priority Data

Sep. 12, 2019 (CN) .......................... 201910864472.4

(51) Int. Cl.
*H04N 23/69* (2023.01)
*G02B 7/10* (2021.01)
*H04N 23/50* (2023.01)
*H04N 23/55* (2023.01)

(52) U.S. Cl.
CPC .............. *H04N 23/69* (2023.01); *G02B 7/10* (2013.01); *H04N 23/50* (2023.01); *H04N 23/55* (2023.01); *G03B 2205/0061* (2013.01)

(58) Field of Classification Search
None
See application file for complete search history.

(56) References Cited

U.S. PATENT DOCUMENTS

| 5,101,278 A | 3/1992 | Itsumi et al. |
| 5,644,440 A | 7/1997 | Akada |

(Continued)

FOREIGN PATENT DOCUMENTS

| CN | 1797053 A | 7/2006 |
| CN | 101065856 A | 10/2007 |

(Continued)

*Primary Examiner* — Quan Pham
(74) *Attorney, Agent, or Firm* — Rimon PC

(57) ABSTRACT

The present application discloses a camera module that includes a base, a guide shaft, a first piezo assembly, a second piezo assembly, a first optical assembly, and a second optical assembly. The first piezo assembly includes a first stator and a first driven element. The first stator includes a first piezo element and a first fixing element. A first cantilever of the first fixing element is configured to amplify vibration generated by the first piezo element in an energized state, and cooperate with the first driven element to drive the first optical assembly to slide. The second piezo assembly includes a second stator and a second driven element, and the second stator includes a second piezo element and a second fixing element. A second cantilever of the second fixing element cooperates with the second driven element to drive the second optical assembly to slide.

20 Claims, 17 Drawing Sheets

(56) References Cited

U.S. PATENT DOCUMENTS

| | | | |
|---|---|---|---|
| 5,774,748 A * | 6/1998 | Ito | G02B 7/102 |
| | | | 396/448 |
| 6,215,605 B1 * | 4/2001 | Kuwana | G02B 7/10 |
| | | | 359/698 |
| 7,199,506 B2 | 4/2007 | Sasaki et al. | |
| 2005/0195502 A1 | 9/2005 | Jeong et al. | |
| 2005/0275315 A1 * | 12/2005 | Manabe | G02B 7/10 |
| | | | 310/328 |
| 2006/0262431 A1 * | 11/2006 | Ohsato | G02B 7/102 |
| | | | 359/824 |
| 2007/0164635 A1 | 7/2007 | Witteveen et al. | |
| 2008/0192363 A1 | 8/2008 | Shirono et al. | |
| 2017/0133579 A1 * | 5/2017 | Suefuji | H02N 2/0065 |
| 2019/0098182 A1 | 3/2019 | Byon et al. | |
| 2021/0018719 A1 * | 1/2021 | Park | G03B 13/36 |

FOREIGN PATENT DOCUMENTS

| | | | |
|---|---|---|---|
| CN | 101477234 A | | 7/2009 |
| CN | 102105829 A | | 7/2009 |
| CN | 101556366 A | | 10/2009 |
| CN | 101206297 B | | 9/2011 |
| CN | 102590979 A | | 7/2012 |
| CN | 203261404 U | | 10/2013 |
| CN | 102890385 A | | 8/2016 |
| CN | 107864338 A | | 2/2020 |
| CN | 210626755 U | * | 5/2020 |
| JP | 2006091210 A | | 4/2006 |
| JP | 2008503995 A | | 2/2008 |
| JP | 2008514978 A | | 5/2008 |
| WO | 2006035435 A2 | | 4/2006 |

* cited by examiner

CAMERA MODULE AND MOBILE TERMINAL

CROSS-REFERENCE TO RELATED APPLICATIONS

This application is a continuation of International Application No. PCT/CN2020/114767, filed on Sep. 11, 2020, which claims priority to Chinese Patent Application No. 201910864472.4, filed on Sep. 12, 2019. The disclosures of the aforementioned applications are hereby incorporated by reference in their entireties.

TECHNICAL FIELD

This application relates to the technical field of camera modules with piezo motors, and in particular, to a camera module applied to a mobile terminal.

BACKGROUND

For a terminal device, requirements for photographing capabilities continue to increase. In many scenarios, a camera module with a zoom function is required. An optical element in the camera module undergoes directional translational motion, to change the distance between the optical assembly and an optical image sensor, thereby achieving the optimal photographing effect. A camera module with a continuous zoom function is an emerging technology, and the basic principle of a continuous zoom mechanism is to change the combined focal length of an optical system through the movement of two or more optical lens groups in the system. However, in the process of adjusting the focal length, images are blurred, and image sharpness needs to be adjusted again, resulting in low image adjustment efficiency of the camera module and poor user experience. How to design the structure of a camera module that can keep the position of an image plane unchanged while maintaining good imaging quality in a zooming process is a subject of continuous exploration in the industry.

SUMMARY

Embodiments of this application provide a camera module and a mobile terminal, so as to implement a function of continuous zooming in the camera module, and ensure high imaging quality in a zooming process.

According to a first aspect, this application provides a camera module, including a base, a guide shaft, a first piezo assembly, a second piezo assembly, and a first optical assembly and a second optical assembly, both of which are successively slidable in the optical axis direction on the guide shaft, where the guide shaft is fixedly connected to the base; the first piezo assembly is connected between the base and the first optical assembly; the first piezo assembly includes a first stator and a first driven element; the first stator includes a first piezo element and a first fixing element that are fixedly connected; the first piezo element and the first fixing element may be of a sheet structure or a film structure; and the first piezo element can vibrate in an energized state, and the first fixing element fixedly connected to the first piezo element can vibrate together with the first piezo element. The first fixing element includes a first cantilever; the first cantilever is configured to amplify the vibration generated by the first piezo element in an energized state (the principle of vibration amplification is similar to the working principle of a tuning fork); the first cantilever cooperates with the first driven element to drive the first optical assembly to slide on the guide shaft; the second piezo assembly is connected between the base and the second optical assembly, or between the first optical assembly and the second optical assembly; the second piezo assembly includes a second stator and a second driven element; the second stator includes a second piezo element and a second fixing element that are fixedly connected; and the structure of the second stator may be the same as that of the first stator. The second fixing element includes a second cantilever; and the second cantilever is configured to amplify the vibration generated by the second piezo element in an energized state, and cooperate with the second driven element to drive the second optical assembly to slide on the guide shaft.

In this application, the first piezo element and the second piezo element are simultaneously energized, the first piezo assembly converts electrical energy into mechanical energy, and the vibration of the first cantilever drives the first driven element to move together with the first optical assembly to achieve zooming. At the same time, the vibration of the second cantilever of the second piezo assembly drives the second driven element to move together with the second optical assembly to achieve image adjustment in the zooming process, so that the camera module can always obtain a clear image in the zooming process. In addition, through the driving manner in which the piezo element converts electric energy into mechanical energy, the camera module has the advantages of employing a small volume and a light weight. In addition, the first piezo assembly and the second piezo assembly do not include a magnetic element, and therefore do not cause magnetic interference to an element such as a sensor, a loudspeaker, and an antenna around the camera module.

In a possible implementation, the first driven element is fixed to the first optical assembly, the second driven element is fixed to the second optical assembly, the first stator and the second stator are both fixed to the base, and the first stator and the second stator are distributed on the same side of the first optical assembly and the second optical assembly. In this implementation, mutually independent translational motion of the first optical assembly and the second optical assembly can be implemented, and functions of continuous zooming and image adjustment of the camera module are implemented. The first stator and the second stator are located on the same side of the first optical assembly and the second optical assembly, facilitating the arrangement of power supply wiring of the camera module. The first stator and the second stator are fixedly connected to the base, the first stator and the second stator are electrically connected to a circuit on a main board of a mobile terminal by using an FPC, and the first stator and the second stator are disposed on the same side of the first optical assembly and the second optical assembly, helping to reduce the risk of fatigue or fracture of the FPC.

In a possible implementation, the extension directions of both the first driven element and the second driven element are aligned with the extension direction of the optical axis, and the first driven element and the second driven element partially overlap. Based on such an arrangement of a positional relationship, relatively large strokes of the first driven element and the second driven element can be obtained, and the first driven element and the second driven element move in the same direction but do not interfere with each other because they have parallel tracks. The first optical assembly and the second optical assembly have large strokes and are driven independently of each other, thereby increasing the zoom range of the camera module and improving photographing quality.

In a possible implementation, the first driven element is fixed to the first optical assembly, the second driven element is fixed to the second optical assembly, the first stator and the second stator are both fixed to the base, and the first stator and the second stator are distributed on two sides of the first optical assembly and the second optical assembly. The mutually independent translational motion of the first optical assembly and the second optical assembly can be implemented, and the first stator and the second stator are disposed on two sides of the first optical assembly and the second optical assembly, so that the assembly space is relatively large, and the first piezo assembly and the second piezo assembly are independent of each other without interference.

In a possible implementation, the base includes a pair of side plates disposed oppositely, the base includes a front end face for mounting a lens and a rear end face for mounting an image sensor, the pair of side plates extends between the front end face and the rear end face, and the first stator and the second stator are respectively fixed to the middle regions of the pair of side plates, where the middle region is the region on the side plate having equal distances from the front end and the rear end. Because the driven elements (that is, the first driven element and the second driven element) are relatively long, the stators (the first stator and the second stator) are placed in the middle regions, thereby reducing the motion space occupied by the driven elements when they move. Specifically, during the positioning of the first stator and the second stator, the middle section of the camera module is first found; the middle cross section is found by using the front and rear end faces of the base as a reference, and the middle cross section is used as the middle section of the camera module; and the first stator and the second stator are fixed by using the middle section as a mounting reference.

In a possible implementation, the first driven element is fixed to the first optical assembly, the first stator is fixed to the base, the second driven element is fixed to the second optical assembly, and the second stator is fixed to the first optical assembly. In this implementation, linkage between the first optical assembly and the second optical assembly can be implemented, so that the camera module has a relatively good continuous zoom function, and positional precision of the second optical assembly relative to the first optical assembly can be improved, thereby improving the imaging effect after zooming.

In a possible implementation, the first stator and the second stator are respectively located on two sides of the first optical assembly, so that a relatively large space can be provided for mounting the first stator and the second stator, the positions of the first stator and the second stator are independent of each other, and their avoidance does not need to be considered in the design and assembly process, thereby improving manufacturing efficiency and reducing design difficulty.

In a possible implementation, the first driven element and the second driven element are fixed to the base, the first driven element and the second driven element are in a track shape, the first optical assembly and the second optical assembly are slidably connected to the first driven element and the second driven element, the first stator is fixed to the first optical assembly, and the second stator is fixed to the second optical assembly. In this implementation, the stability of the movement of the first optical assembly and the second optical assembly can be improved. In addition, a driven track has the functions of both a movable track and a driven element, thereby effectively saving the accommodating space of the camera module, and facilitating the development of a camera module with a small volume and a light weight.

In a possible implementation, the first stator and the second stator are located on the same side of the first optical assembly and the second optical assembly. In this implementation, mutually independent translational motion of the first optical assembly and the second optical assembly can be implemented, and functions of continuous zooming and image adjustment of the camera module are implemented. The first stator and the second stator are located on the same side of the first optical assembly and the second optical assembly, facilitating arrangement of power supply wiring of the camera module. The first stator and the second stator are fixedly connected to the base, the first stator and the second stator are electrically connected to a circuit on a main board of a mobile terminal by using an FPC, and the first stator and the second stator are disposed on the same side of the first optical assembly and the second optical assembly, helping to reduce the risk of fatigue or fracture of the FPC.

In an implementation, the first piezo assembly includes a first holder, which is configured to mount the first optical assembly; the first holder includes a first body, a second body, and a connection part; the first body and the second body are relatively spaced apart, and an accommodating space is formed between the first body and the second body; and the accommodating space is used to accommodate the first optical assembly. The accommodating space has an opening in the region between the top surface of the first body and the top surface of the second body. The first optical assembly partially extends into the accommodating space from the position of the opening. A mounting part of the first optical assembly is attached to the top surface of the first body and the top surface of the second body.

Specifically, the first body includes a first surface facing the second body, and the first surface is used to carry the first optical assembly; the second body includes a second surface facing the first body, and similarly, the second surface is used to carry the first optical assembly, and a bevel segment or an arc segment on the first surface and a bevel segment or an arc segment on the second surface are symmetrically disposed. When the first optical assembly is mounted to the first holder, the first surface and the second surface are separately attached to the outer surface of a body part of the first optical assembly, and a buffer material such as foam may be disposed at an attachment position, so as to prevent the first optical assembly from shaking during the use of the camera module. In another implementation, the surfaces on which the first body and the second body are attached to the first optical assembly may alternatively be disposed as soft glue. The soft glue has an elastic deformation capability, so that elastic contact may be formed between the first optical assembly and the first holder, and the first optical assembly and the first holder are not easy to shake, preventing the first optical assembly from shaking during the use of the camera module.

In a possible implementation, the first piezo assembly further includes a first adapter and a first power supply element, and the first stator and the first power supply element are respectively fixed to two opposite sides of the first adapter. The first stator and the first power supply element are assembled into an integral module structure by using the first adapter, facilitating assembly and improving assembly precision.

In a possible implementation, the first fixing element includes a body, a fixing part, and the first cantilever; the first piezo element is fixed on both the front and back surfaces of the body; both the fixing part and the first cantilever extend out of an edge of the body; the fixing part fixes the first stator to the first adapter, and forms a gap between the first piezo element and the first adapter.

In a possible implementation, the quantity of the first stators is two or more; in the extension direction of the optical axis, the two or more first stators are arranged in a row; and the quantity of contact regions of the first driven element that cooperate with the first cantilever is two, and the two contact regions are distributed on two sides of the two or more first stators.

In a possible implementation, the quantity of the first stators is two or more; the first stators are disposed in an overlapping manner, and the quantity of the first cantilevers is equal to or greater than the quantity of the first stators; and the quantity of contact regions of the first driven element that cooperate with the first cantilever is two, and the two contact regions are distributed on two sides of the two or more first stators.

In a possible implementation, the quantity of the first stators is two or more; in the extension direction of the optical axis, the two or more first stators are arranged in a row; and the quantity of contact regions of the first driven element that cooperate with the first cantilever is one, and the contact region is distributed on the same side of the two or more first stators.

In a possible implementation, the quantity of the first stators is two; and the quantity of contact regions of the first driven element that cooperate with the first cantilever is one, and the two first stators are symmetrically distributed on two sides of the contact region.

Structures of the first fixing element and the second fixing element may be the same. The first fixing element includes a body, a fixing part, and a first cantilever; a shape of the body is similar to that of the first piezo element; and both the front and back surfaces of the body are used for bonding the first piezo element. Both the fixing part and the first cantilever extend out of the edge of the body. Specifically, the quantity of fixing parts is two, and the two fixing parts are respectively connected to middles of two opposite side edges of the body to provide a balanced supporting force for the body; and the fixing parts are configured to fix the first stator to the first adapter and form a gap between the first stator and the first adapter. In other words, the first piezo element of the first stator is not in contact with the first adapter, so that vibration can be generated by the first piezo element in an energized state.

At a position between the two adjacent first stators, two fixing parts respectively extend out of the bodies of the two first fixing elements and partially overlap.

In a possible implementation, the first driven element includes a fixing region and a contact region forming a hollow region with the fixing region; the fixing region is used to be fixedly connected to the first optical assembly; and the contact region is in contact with the first cantilever, and applies an elastic pre-stress to the first cantilever.

In a possible implementation, there are two contact regions, which are symmetrically disposed on two sides of the fixing region. The two contact regions are both provided with grooves, openings of the two grooves are opposite to each other, and a free end of the first cantilever extends into the groove and cooperates with the contact region.

In a possible implementation, two ends of each contact region are separately connected to the fixing region by using a connection region, and each connection region includes a first connection segment, a second connection segment, and a third connection segment that are successively connected between the fixing region and the contact region. The first connection segment is used to provide disturbance during the movement of the first driven element, and a size of a cross section of the third connection segment is smaller than a size of a cross section of the second connection segment and a size of a cross section of the contact region, so as to provide an elastic deformation capability of the contact region.

In a possible implementation, the camera module further includes a first position sensor, a second position sensor, and a position element; the first position sensor is fixed to the base, the position element is fixedly connected to the first optical assembly and is located on a side of the first optical assembly facing the first position sensor; the second position sensor is fixed to the second optical assembly, a moving distance or a position of the first optical assembly is determined through cooperation between the first position sensor and the position element, and a moving distance or a position of the second optical assembly is determined through cooperation between the second position sensor and the position element.

Specifically, the position element may be a magnetic element (for example, a magnet), the position element is in a strip shape, a part of the position element faces the first optical assembly on a plane perpendicular to the optical axis, and a part of the position element extends to the outside of the first optical assembly in the direction of the second optical assembly.

In a possible implementation, the first position sensor, the second position sensor, and the position element form at least a part of the position detection assembly; and the position detection assembly and the first stator are respectively disposed on two sides of the first optical assembly, or the position detection assembly and the first stator are located on the same side of the first optical assembly.

According to a second aspect, a mobile terminal provided in this application includes a controller and the camera module provided in any one of the foregoing implementations, and the first stator and the second stator are electrically connected to the controller, to supply power to the first piezo element and the second piezo element.

BRIEF DESCRIPTION OF DRAWINGS

To describe technical solutions in embodiments of this application or in the background more clearly, the following describes accompanying drawings for describing the embodiments of this application or the background.

DESCRIPTION OF EMBODIMENTS

The following describes embodiments of this application with reference to accompanying drawings in the embodiments of this application.

Figure 1:
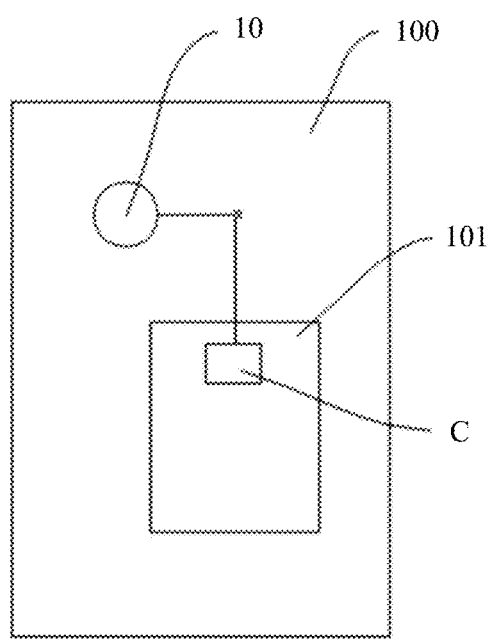
FIG. 1 is a schematic diagram of application of a camera module in a mobile terminal according to this application.

A camera module used in this application is applied to a mobile terminal, and the mobile terminal may be a smartphone, a tablet computer, a vehicle-mounted monitoring device, or the like. As shown in FIG. 1, a smartphone is used as an example. In this implementation, a mobile terminal 100 includes a camera module 10, where the camera module 10 may be a rear-facing camera, or may be a front-facing camera. The camera module 10 drives an optical assembly by using a piezo assembly (a piezo motor), to implement a continuous zoom function, and ensure that an image is clear in a zooming process. A main board 101 in the mobile terminal supplies power to the piezo motor of the camera module 10, and a controller C on the main board 101 obtains specific position information of the optical assembly in the camera module 10. During use, the piezo motor drives the optical assembly to move, so that a focal length and an image can be adjusted based on a scenario requirement, to obtain a high-quality imaging effect.

The camera module provided in this application includes a base, a guide shaft, a first piezo assembly, a second piezo assembly, and a first optical assembly and a second optical assembly that are successively slidable in the optical axis direction on the guide shaft, where the guide shaft is fixedly connected to the base; the first piezo assembly is connected between the base and the first optical assembly, the first piezo assembly includes a first stator and a first driven element, the first stator includes a first piezo element and a first fixing element that are fixedly connected, a first cantilever of the first fixing element amplifies vibration generated by the first piezo element in an energized state, and the first cantilever cooperates with the first driven element to drive the first optical assembly to slide on the guide shaft, so as to implement zooming of the camera module; the second piezo assembly is connected between the base and the second optical assembly, or between the first optical assembly and the second optical assembly, the second piezo assembly includes a second stator and a second driven element, the second stator includes a second piezo element and a second fixing element that are fixedly connected, a second cantilever of the second fixing element amplifies vibration generated by the second piezo element in an energized state, and the second cantilever cooperates with the second driven element to drive the second optical assembly to slide on the guide shaft, so as to adjust an effect of an image shot by the camera module and ensure that the image of the camera module is clear during zooming.

The first piezo assembly and the second piezo assembly in the camera module of this application are respectively used as piezo motors for driving the first optical assembly and the second optical assembly to move. The stator part in the piezo assembly is used as a power source. Specifically, the stator includes a piezo element and a fixing element, and the piezo element is made of a piezo material, such as piezo ceramic. By using a property of the piezo material for converting electric energy into mechanical energy, the piezo element generates vibration in an energized state, and the cantilever of the fixing element amplifies the vibration and drives the optical assembly to move, so that the camera module moves. In this way, the camera module has advantages of a specific small volume and a light weight. In addition, the first piezo assembly and the second piezo assembly do not include a magnetic element, and therefore do not cause magnetic interference to an element such as a sensor, a loudspeaker, and an antenna around the camera module.

In this application, there are a plurality of different implementations for a specific structure and position layout of the piezo assembly in the camera module, where "the first piezo assembly is connected between the base and the first optical assembly" includes: a first stator is fixed to the base, the first driven element is fixed to the first optical assembly (for details, refer to Embodiment 1, Embodiment 2, and Embodiment 3 below). Alternatively, the first stator is fixed to the first optical assembly and the first driven element is fixed to the first base (for details, refer to Embodiment 4 below, where a driven track is equivalent to the first driven element). "The second piezo assembly is connected between the base and the second optical assembly, or between the first optical assembly and the second optical assembly" includes: a second stator is fixed to the second base, the second driven element is fixed to the second optical assembly (for details, refer to Embodiment 1 and Embodiment 2 below). Alternatively, the second stator is fixed to the second optical assembly and the second driven element is fixed to the second base (for details, refer to Embodiment 4 below, where the driven track is equivalent to the first driven element). Alternatively, the second stator is fixed to the first optical assembly, and the second driven element is fixed to the second optical assembly (for details, refer to Embodiment 3 below).

The manner of "fixing" or "fixed connection" described in this application is not limited to direct fixed connection or indirect fixed connection by using another adapter.

This application is described in detail by using the following four main embodiments (Embodiment 1, Embodiment 2, Embodiment 3, and Embodiment 4).

Embodiment 1

Figure 2:
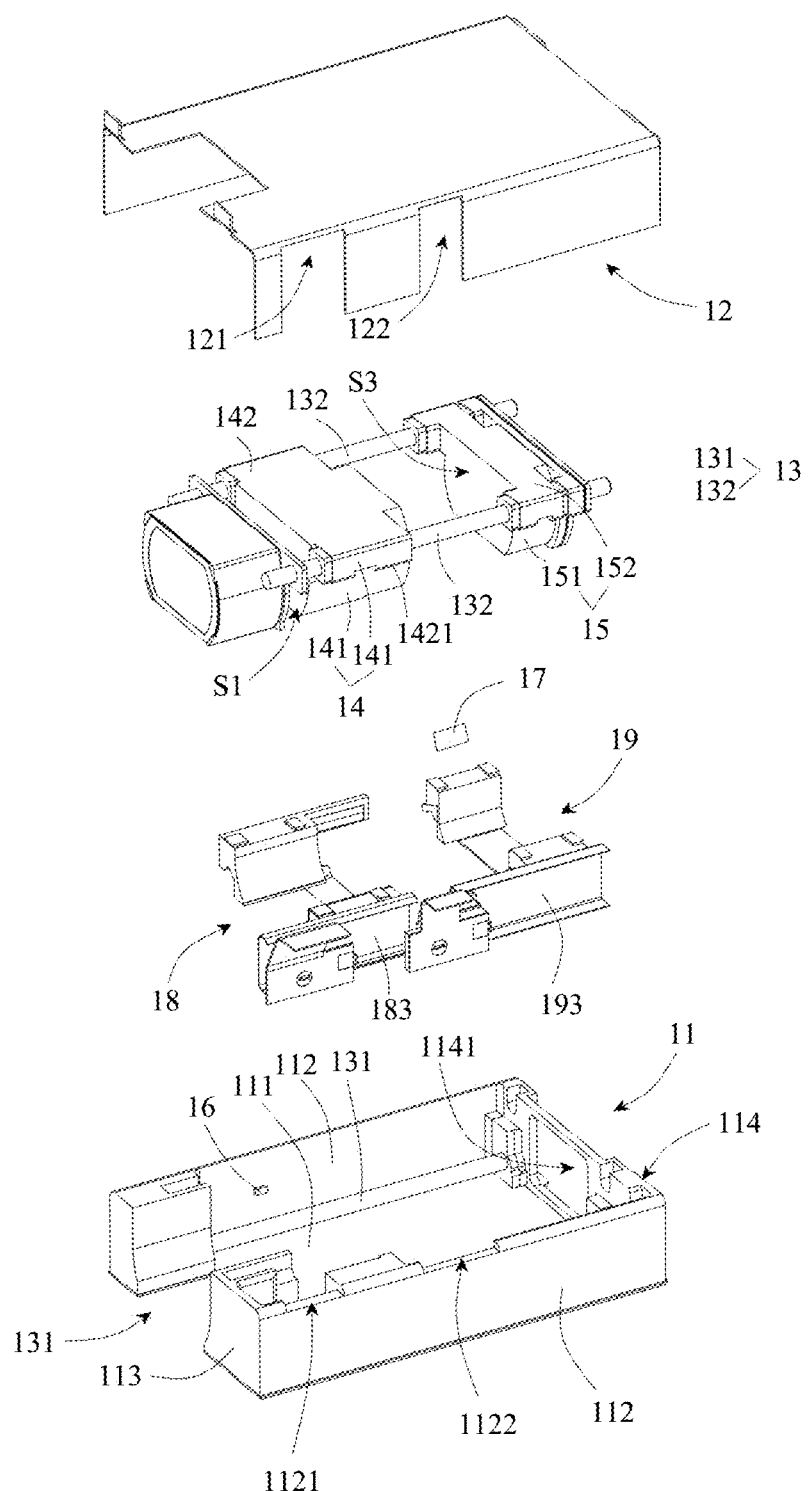
FIG. 2 is a three-dimensional exploded view of a camera module according to Embodiment 1.
Figure 3:
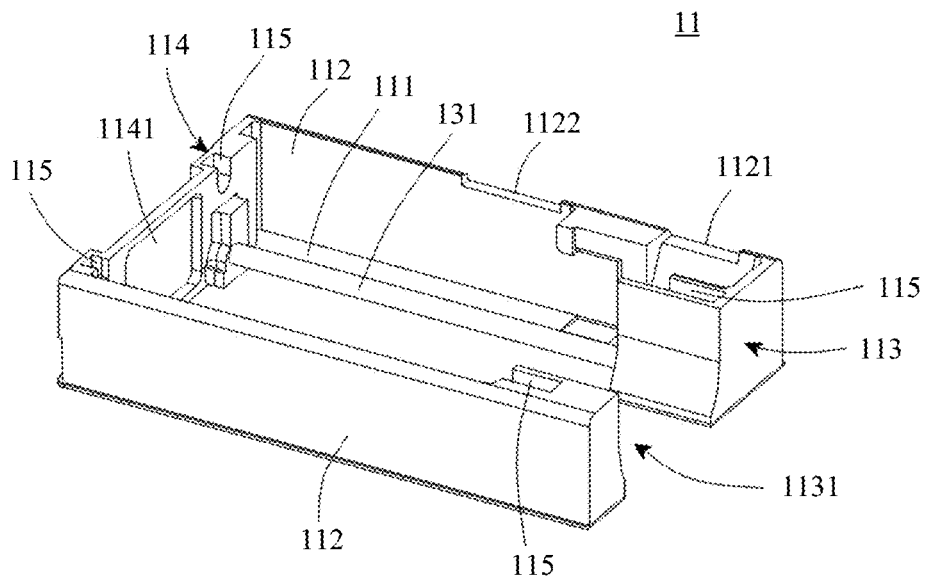
FIG. 3 is a three-dimensional diagram of a base of a camera module according to Embodiment 1.
Figure 4:
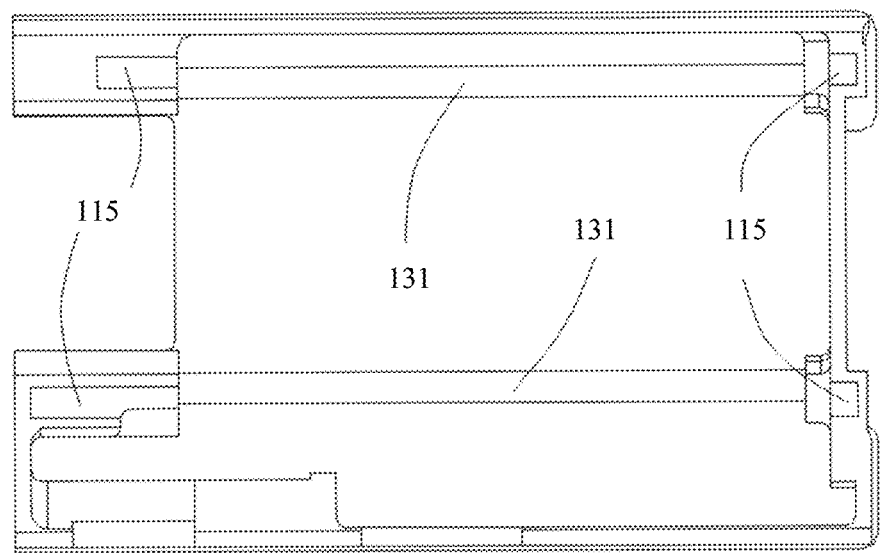
FIG. 4 is a top view of a base of a camera module according to Embodiment 1.

As shown in FIG. 2, FIG. 3, and FIG. 4, the camera module 10 includes a base 11 and a housing 12. The base 11 includes a bottom plate 111 and a pair of side plates 112. The bottom plate 111 is substantially rectangular, and the pair of side plates 112 are located on a pair of opposite edges of the bottom plate 111. A front end face 113 and a rear end face 114 of the base 11 are formed on another pair of opposite edges of the bottom plate 111, and between the pair of side plates 112. An opening is provided at positions of both the front end face 113 and the rear end face 114. The position of the opening 1131 of the front end face 113 is used for mounting a lens, and the position of the opening 1141 of the rear end face 114 is used for mounting an image sensor. The pair of side plates 112 extend between the front end face 113 and the rear end face 114. The bottom plate 111 and the pair of side plates 112 jointly enclose accommodating space. The housing 12 covers the base 11 and seals the accommodating space on the top of the base 11.

A notch is disposed at a position at which the housing 12 and the base 11 are connected. There are two notches, which are distributed on the same side of the base 11. The notch is configured to communicate with the accommodating space and the outside, and is used for an FPC to pass through the notch, so as to electrically connect the camera module 10 and the main board of the mobile terminal. In this implementation, a first groove 1121 and a second groove 1122 are disposed on the top that is of a side plate 112 of the base 11 and that is away from the bottom plate 111, and a first notch 121 and a second notch 122 are disposed on one side arm of the housing 12. After the housing 12 is mounted to the base 11, the first notch 121 and the first groove 1121 are directly opposite to and communicate with each other, so as to form a notch communicating with the accommodating space and the outside. Similarly, the second notch 122 and the second groove 1122 are directly opposite to and communicate with each other, so as to form a notch communicating with the accommodating space and the outside.

Other elements of the camera module 10 are disposed in the accommodating space. The elements disposed in the accommodating space include a guide shaft 13, a first optical assembly 14, a second optical assembly 15, a first position sensor 16, a second position sensor 17, a first piezo assembly 18, and a second piezo assembly 19.

The guide shaft 13 is fixedly connected to the base 11. There are at least two guide shafts 13, which are disposed in parallel, and the guide shafts 13 are all parallel to the optical axis of the camera module 10. In the embodiments shown in FIG. 2, FIG. 3, and FIG. 4, the quantity of guide shafts 13 is four. Two guide shafts 13 are first shafts 131, and the first shafts 131 are fixed at positions close to the bottom plate 111 of the base 11, and may be designed as an integral structure with the base 11. The other two guide shafts 13 are second shafts 132, and the second shafts 132 are fixed to positions that are inside the base 11 and that are close to the housing 12 opposite to the bottom plate 111. A fixing groove 115 is provided in the base 11 and two ends of the second shaft 132 are fixed in the fixing groove 115. The two first shafts 131 are used for mounting the first piezo assembly 18 and the second piezo assembly 19, and the two second shafts 132 are used for mounting the first optical assembly 14 and the second optical assembly 15.

The first optical assembly 14 and the second optical assembly 15 are successively distributed between an object side and an image side in the optical axis direction and are slidably connected to the guide shaft 13 (specifically, the second shaft 132). The extension direction of the optical axis is the direction in which the front end face 113 and the rear end face 114 of the base 11 extend vertically, the object side is a position at which an object photographed by the camera module 10 is located, the front end face 113 of the base 11 faces the object side, and the rear end face 114 of the base 11 is an image side, that is, a position at which the image sensor is disposed.

The first optical assembly 14 includes a body part 141 and two mounting parts 142. The body part 141 includes an object-side surface S1 and an image-side surface (un-labelled, which is a surface facing an object side surface S3 of the second optical assembly 15 in FIG. 2). The body part 141 is an optical element integration region for light transmission. The two mounting parts 142 are symmetrically disposed on two sides of the body part 141, and are connected to positions on the top of the body part 141. Each of the two mounting parts 142 is provided with a through hole (un-labelled, that is, a region through which the second shaft 132 passes). The extension direction of the through hole is aligned with the extension direction of the optical axis. Each of the two mounting parts 142 includes a positioning surface 1421, and the positioning surface 1421 faces the bottom of the body part 141. The positioning surfaces 1421 of the two mounting parts 142 are coplanar and used for mounting the first optical assembly 14 to the first piezo assembly 18.

The second optical assembly 15 also includes a body part 151 and two mounting parts 152. The body part 151 of the second optical assembly 15 is an optical element integration region and is used for light transmission. A specific structure of the body part 151 of the second optical assembly 15 may be different from a specific structure of the body part 141 of the first optical assembly 14. For example, the body part 151 of the second optical assembly 15 and the body part 141 of the first optical assembly 14 have different types of lens composition. Functions of the body part 141 of the first optical assembly 14 and the body part 151 of the second optical assembly 15 may be different. For example, in an implementation, the position of the body part 141 of the first optical assembly 14 is adjusted for zooming of the camera module 10, and the position of the body part 151 of the second optical assembly 15 is adjusted for adjusting an image effect. The mounting part 142 of the first optical assembly 14 and the mounting part 152 of the second optical assembly 15 may have the same structure, and the through hole on the mounting part 152 of the second optical assembly 15 is collinear with the through hole on the mounting part of the first optical assembly 14. The guide shaft 13 (the second shaft 132) successively passes through the through hole on the mounting part 142 of the first optical assembly 14 and the through hole on the mounting part 152 of the second optical assembly 15, so that the first optical assembly 14 and the second optical assembly 15 are connected in series to the second shaft 132.

The first piezo assembly 18 includes a first holder 181, a position element 182, a first driven element 183, a first stator 184, a first adapter 185, and a first power supply element 186.

The first holder 181 is configured to mount the first optical assembly 14. The first holder 181 includes a first body 1811, a second body 1812, and a connection part 1813. The first body 1811 and the second body 1812 are relatively spaced apart, and accommodating space C1 is formed between the first body 1811 and the second body 1812. The accommodating space C1 is used to accommodate the first optical assembly 14. A top surface A1 of the first body 1811 and a top surface A2 of the second body 1812 are coplanar. Specifically, the top surface A1 of the first body 1811 is provided with two mounting pads P1, and the top surface A2 of the second body 1812 is provided with two mounting pads P2. The four mounting pads P1 and P2 are intended to correct flatness of the top surface of the first body 1811, and the first optical assembly 14 is mounted on the mounting pads P1 and P2. The connection part 1813 is connected between the bottom surface of the first body 1811 and the bottom surface of the second body 1812. Specifically, the first body 1811 and the second body 1812 are plastic parts, and the connection part 1813 is a metal plate. The accommodating space C1 has an open opening in a region between the top surface A1 of the first body 1811 and the top surface A2 of the second body 1812.

The first optical assembly 14 partially extends into the accommodating space C1 from a position of the opening. The mounting part 142 of the first optical assembly 14 is attached to the top surface A1 of the first body 1811 and the top surface A2 of the second body 1812. The first optical assembly 14 is fixed to the first holder 181 by using a positioning surface on the mounting part 142, which is attached to the top surface A1 of the first body 1811 and the top surface A2 of the second body 1812, and is fixed by adhesive.

The first body 1811 includes a first surface 18112 facing the second body 1812, and the first surface 18112 may include a bevel segment or an arc segment for carrying the body part 141 of the first optical assembly 14. The second body 1812 includes a second surface 18122 facing the first body 1811, and similarly, the second surface 18122 may include a bevel segment or an arc segment for carrying the body part of the first optical assembly 14. The bevel segment or the arc segment on the first surface 18112 is symmetrically disposed with the bevel segment or the arc segment on the second surface 18122. When the first optical assembly 14 is mounted to the first holder 181, the first surface 18112 and the second surface 18122 are separately attached to an outer surface of a body part 141 of the first optical assembly 14, and a buffer material such as foam may be disposed at an attachment position, so as to prevent the first optical assembly 14 from shaking during use of the camera module 10. In another implementation, the surfaces on which the first body 1811 and the second body 1812 are attached to the first optical assembly 14 may alternatively be disposed as soft glue. The soft glue has an elastic deformation capability, so that elastic contact may be formed between the first optical assembly 14 and the first holder, and the first optical assembly 14 and the first holder are not easy to shake, preventing the first optical assembly 14 from shaking during use of the camera module 10. The bottom of the first body 1811 and the bottom of the second body 1812 are respectively provided with grooves 18114 and 18124, and shapes of the grooves 18114 and 18124 match shapes of the two first shafts 131. The first holder 181 may be positioned within the base 11 through cooperation between the grooves 18114 and 18124 and the first shafts 131. In this way, the first optical assembly 14 and the first piezo assembly 18 are more firmly assembled in the base 11, and a zooming process of the camera module 10 is more balanced during use, and the camera module 10 is not easy to shake.

The position element 182 is fixedly connected to the surface of the first body 1811 facing away from the second body 1812. The position element 182 may be a magnetic element (for example, a magnet). In this implementation, the position element 182 is in a strip shape. A part of the position element 182 faces the first optical assembly 14 on a plane perpendicular to the optical axis, and a part of the position element 182 extends to the outside of the first optical assembly 14 in the direction toward the second optical assembly 15. Specifically, the first body 1811 includes a strip-shaped fixing part 18115, the position element 182 is fixed to the strip-shaped fixing part 18115, the position element 182 is a magnetic element, the strip-shaped fixing part 18115 is a plastic part, and the position element 182 and the strip-shaped fixing part 18115 are fixed by adhesive.

With reference to FIG. 2, the first position sensor 16 is fixed on the base 11. Specifically, the first position sensor 16 is fixed to an inner surface of the side plate 112 of the base 11, and the first position sensor 16 is disposed opposite to the position element 182. The position element 182 is configured to cooperate with the first position sensor 16 to determine a moving distance or a position of the first optical assembly 14. Specifically, the first position sensor 16 is a Hall sensor (Hall sensor), the first position sensor 16 is fixed on the base 11, the position element 182 is fixed on the first holder 181, and the first holder 181 moves synchronously with the first optical assembly 14. The position element 182 and the first position sensor 16 are respectively fixed on a movable assembly and a static assembly. When positions of the position element 182 and the first position sensor 16 move relative to each other, a magnetic field on a surface of the first position sensor 16 changes with the relative motion, and the first position sensor 16 generates a corresponding current with the change of the magnetic field. A control circuit on the main board of the mobile terminal determines the moving distance and the position of the first optical assembly 14 based on a magnitude of the current.

Figure 5:
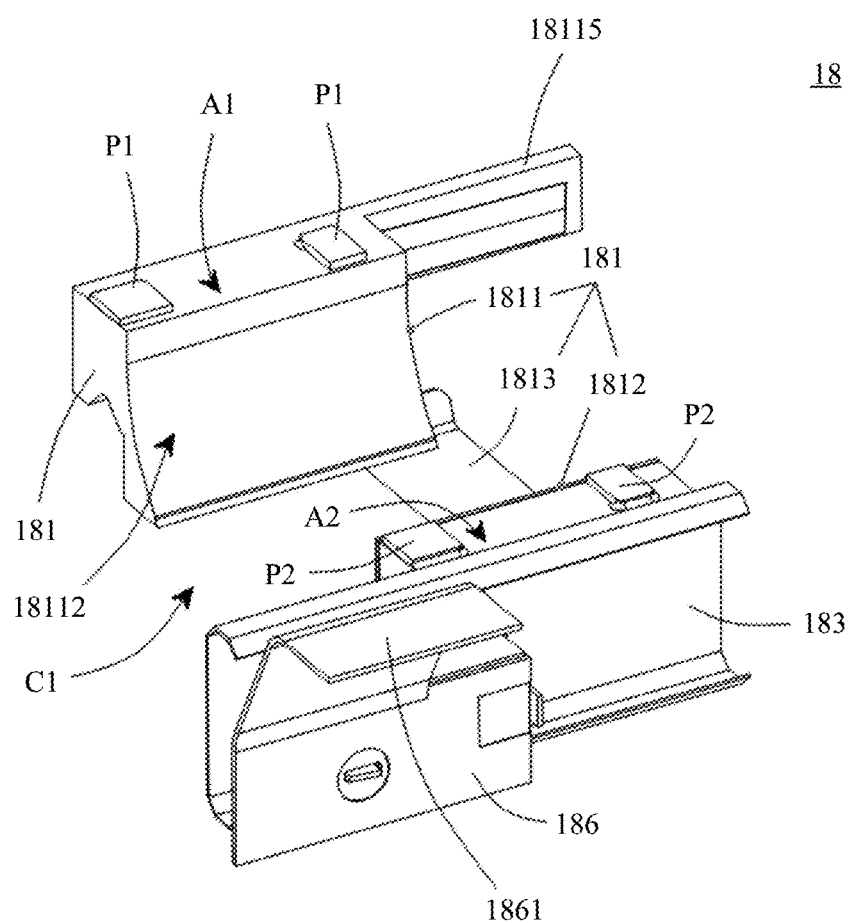
FIG. 5 is an assembly diagram of a first piezo assembly of a camera module according to Embodiment 1.
Figure 6:
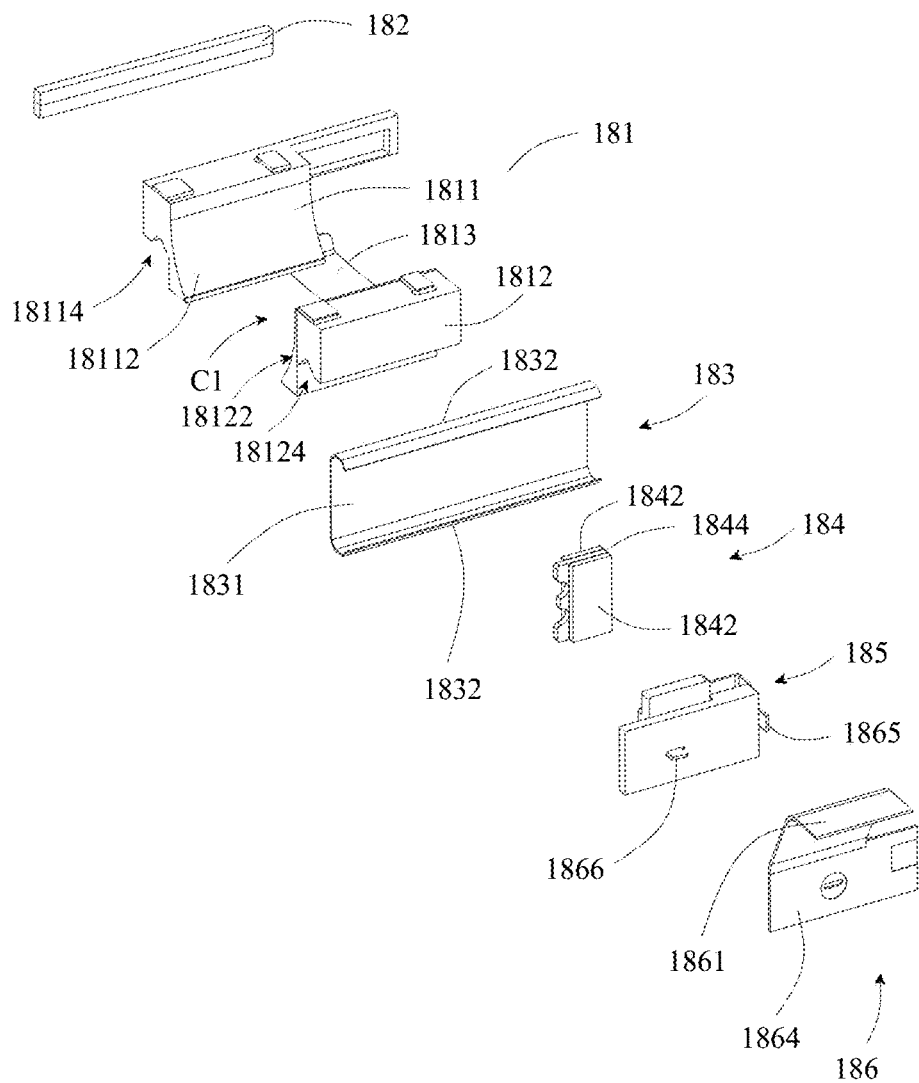
FIG. 6 is a schematic exploded diagram of a first piezo assembly of a camera module according to Embodiment 1.

As shown in FIG. 5 and FIG. 6, the first driven element 183 and the position element 182 are located on two opposite sides of the first holder 181, respectively. The first driven element 183 may be fixedly connected to the surface of the second body 1812 facing away from the first body 1811 by adhesive, or the first driven element 183 and the second body 1812 may be disposed as an integral structure, which is formed through integral molding. In an implementation, the second body 1812 is a plastic part, and the first driven element 183 is a metal part. The first driven element 183 includes a fixing part 1831 and a pair of contact regions 1832. The fixing part 1831 is configured to be fixedly connected to the second body 1812 of the first holder 181, and the pair of contact regions 1832 are located on two opposite sides of the fixing part 1831, and are bent and extended in the same direction from the surface of the fixing part 1831. When the first driven element 183 is a metal part, the contact region may be formed by using a manufacturing process of bending a sheet metal part in which the top and the bottom of the fixing part 1831 are bent in the same direction. Each contact region 1832 is bent to form a groove, and openings of two grooves are oppositely disposed. The contact region 1832 is configured to cooperate with the first cantilever of the first stator 184 so that the first stator 184 drives the first driven element 183 to translate.

The first stator 184 is fixedly connected to the first adapter 185 and the first power supply element 186 to form at least a part of the driving assembly. In other words, the driving assembly may further include elements other than these three elements, such as a conductive part and an elastic part. In this implementation, the driving assembly is fixedly connected to the side plate 112 of the base 11, the first power supply element 186 passes through the side plate 112 and the housing 12 and is electrically connected to the main board of the mobile terminal, the first stator 184 is in contact with and cooperates with the first driven element 183, and the first adapter 185 is connected between the first stator 184 and the first power supply element 186.

Figure 7:
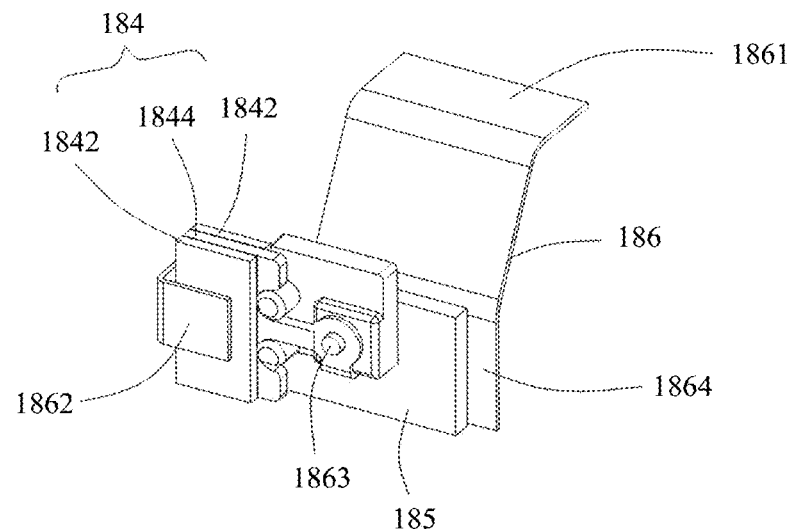
FIG. 7 is a schematic diagram of a first stator, a first adapter, and a first power supply element of a camera module that are assembled in another direction according to Embodiment 1.

Refer to FIG. 6 and FIG. 7. Specifically, the first power supply element 186 is an FPC, and the first power supply element 186 includes an external connector 1861, a first electrode 1862, and a second electrode 1863. The external connector 1861 extends out of the base 11 and the housing 12. The first electrode 1862 and the second electrode 1863 are electrically connected to the first stator 184 by bypassing the first adapter 185, so as to supply power to the first stator 184. In this implementation, the first power supply element 186 includes a main FPC 1864, a first conductive part 1865, and a second conductive part 1866. The main FPC 1864, the first adapter 185, and the first stator 184 are successively stacked, and the external connector 1861 is disposed on the main FPC. The first conductive part 1865 is made of a flexible material, such as a conductive film or an FPC. The first electrode 1862 is formed on the first conductive part 1865, one end of the first conductive part 1865 is electrically connected to an edge position of the main FPC and bypasses a periphery of the first adapter 185, and the first electrode 1862 is fixed on a surface of the first stator 184 facing away from the main FPC 1864. The second electrode 1863 is formed on the second conductive part 1866. One end of the second conductive part 1866 is fixed through a through hole in the main FPC 1864, and is electrically connected to a surface of the main FPC 1864 facing the side plate 112 of the base 11. The other end of the second conductive part 1866 is the second electrode 1863, and the second electrode 1863 is fixed through the first adapter 185 and is electrically connected to the first stator 184.

The first stator 184 includes a first piezo element 1842 and a first fixing element 1844 that are fixedly connected. The first piezo element 1842 and the first fixing element 1844 may be of a sheet structure or a thin film structure. The first piezo element 1842 can generate vibration in an energized state, and the first fixing element 1844 fixedly connected to the first piezo element 1842 can also vibrate together. In another implementation, the first piezo element 1842 may alternatively be formed by laminating and bonding a plurality of thin piezo films (or piezo elements). In this implementation, there are two first piezo elements 1842, which are distributed on two sides of the first fixing element 1844, and the first fixing element 1844 is sandwiched between the two first piezo elements 1842 and fixed by adhesive. Within the base 11, one first piezo element 1842 faces the first adapter 185, and the other first piezo element 1842 faces the fixing part 1831 of the first driven element 183. The first piezo element 1842 is made of a piezo ceramic material, and the first fixing element 1844 is made of a metal material.

Figure 8:
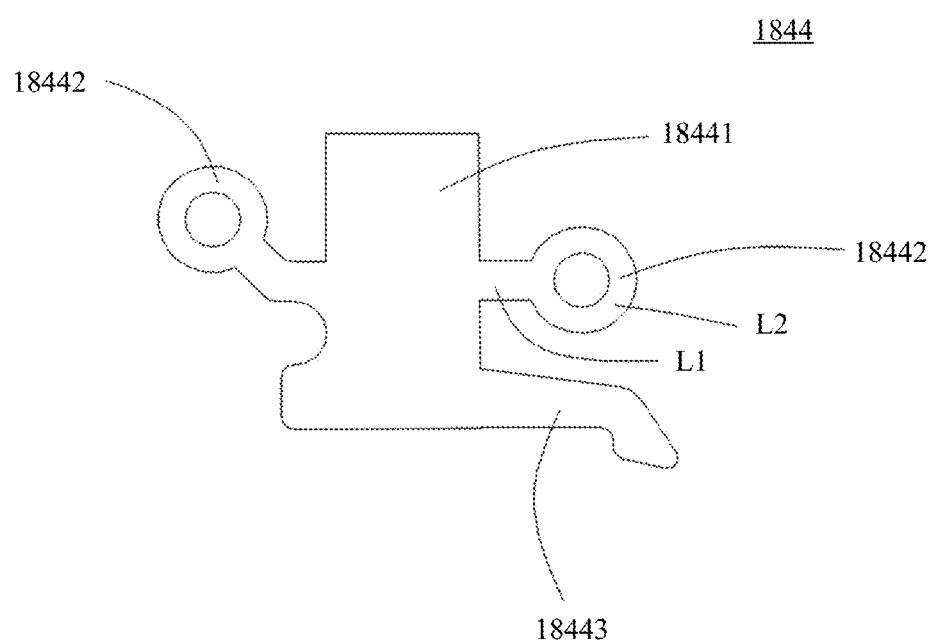
FIG. 8 is a plan view of a first fixing element in a first stator of a camera module according to Embodiment 1.

As shown in FIG. 8, the first fixing element 1844 includes a body 18441, a fixing part 18442, and a first cantilever 18443. A shape of the body 18441 is similar to that of the first piezo element 1842, and both front and back surfaces of the body 18441 are used to bond the first piezo element 1842. Both the fixing part 18442 and the first cantilever 18443 extend out of the edge of the body 18441. Specifically, there are two fixing parts 18442, and the two fixing parts 18442 are respectively connected to middles of two opposite side edges of the body 18441, to provide a balanced supporting force for the body 18441. For example, the body 18441 is substantially rectangular, two fixing parts 18442 extend out of the middle of a long side of the body 18441, and the fixing parts 18442 are configured to fix the first stator 184 to the first adapter 185, so that a gap is formed between the first stator 184 and the first adapter 185. In other words, the first piezo element 1842 of the first stator 184 is not in contact with the first adapter 185. This can ensure that the first piezo element 1842 vibrates when the first piezo element 1842 is energized. The fixing part 18442 includes a connection arm L1 and a fixing leg L2. The connection arm L1 is connected between the body 18441 and the fixing leg L2. The fixing leg L2 is fixedly connected to the first adapter 185. The connection arm L1 supports the body 18441 together with the first piezo element 1842 from the first adapter 185. The first cantilever 18443 extends out of the body 18441, and the first cantilever 18443 cooperates with the first driven element 183. Specifically, the first cantilever 18443 extends into the groove of the contact region 1832 of the first driven element 183 and abuts against the contact region 1832. The first piezo element 1842 vibrates in an energized state, the vibration of the first piezo element 1842 is amplified by the first cantilever 18443 of the first fixing element 1844, and a free end of the first cantilever 18443 is in contact with the surface of the contact region 1832 in an elliptic motion in the groove. The elliptic motion of the free end of the first cantilever 18443 can drive the first driven element 183 to move in the direction of the guide shaft 13, and further drive the first optical assembly 14 to slide on the guide shaft 13. In this application, the first stator 184, the first adapter 185, and the first power supply element 186 are assembled into one module, and then the module is assembled in the base 11.

Figure 9:
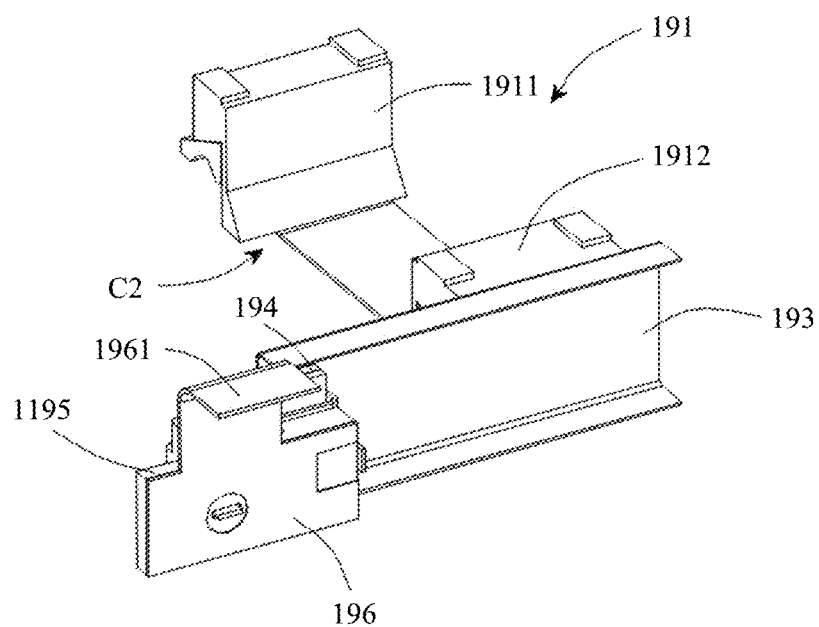
FIG. 9 is an assembly diagram of a second piezo assembly of a camera module according to Embodiment 1.
Figure 10:
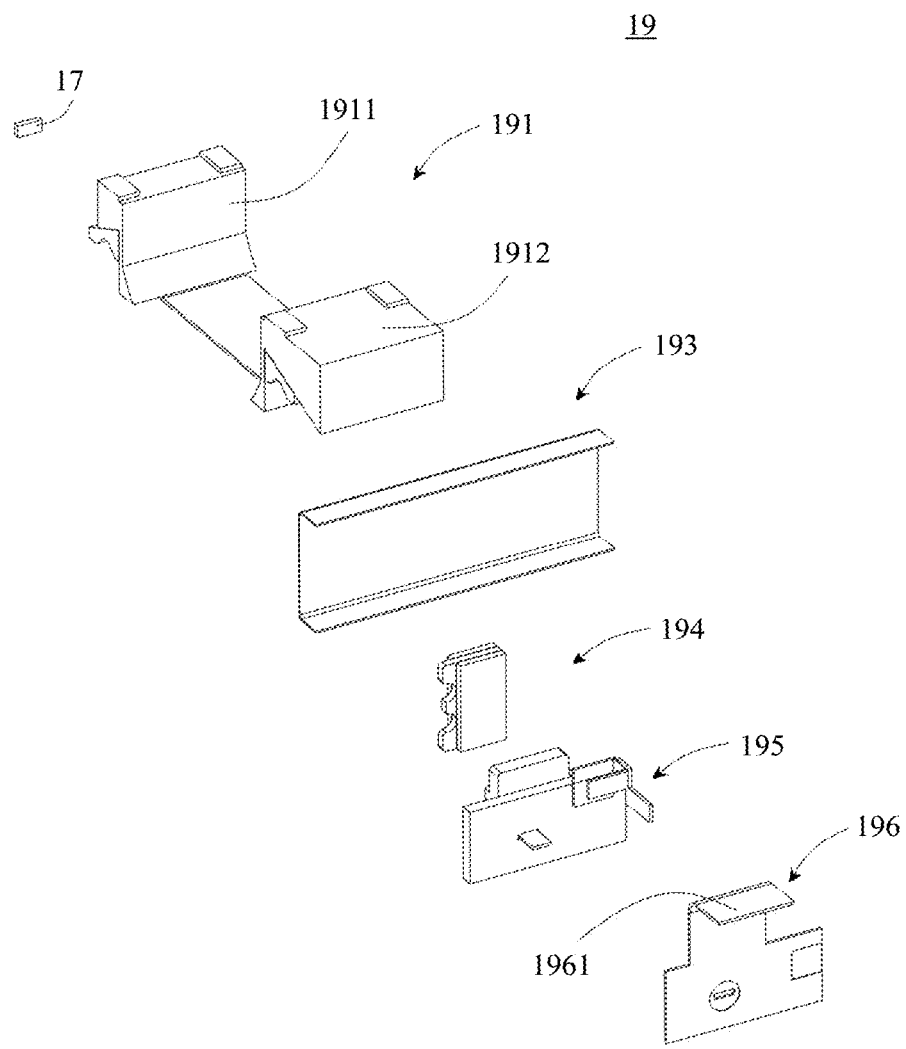
FIG. 10 is a schematic exploded diagram of a second piezo assembly of a camera module according to Embodiment 1.

Refer to FIG. 9 and FIG. 10. In this implementation, a structure of the second piezo assembly 19 is substantially the same as that of the first piezo assembly 18, and the second piezo assembly 19 includes a second holder 191, a second driven element 193, a second stator 194, a second adapter 195, and a second power supply element 196. The structure of the second holder 191 is the same as that of the first holder 181, and the second optical assembly 15 is mounted on the first body 1911 and the second body 1912 of the second holder 191 and partially extends into accommodating space C2 between the first body 1911 and the second body 1912 of the second holder 191. A main difference between the second piezo assembly 19 and the first piezo assembly 18 is that the second piezo assembly 19 does not include a position element, the second position sensor 17 is fixed to the first body 1911 of the second holder 191, the second position sensor 17 faces the side plate 112 of the base 11, and the second position sensor 17 and the position element 182 of the first piezo assembly 18 are located on the same side of the first optical assembly 14 and the second optical assembly 15. The first position sensor 16 and the second position sensor 17 share a position element 182. The second position sensor 17 and the position element 182 are disposed on the second optical assembly 15 and the first optical assembly 14, respectively. When the second optical assembly 15 moves relative to the first optical assembly 14 (which may be understood that the first optical assembly 14 does not move, and the second optical assembly 15 moves, or both the second optical assembly 15 and the first optical assembly 14 move, but there is relative displacement between them), a magnetic field on the surface of the second position sensor 17 changes, and a current is generated. A moving distance and a position of the second optical assembly 15 are further determined based on a magnitude of the current. In this application, the second optical assembly 15 is configured to adjust sharpness of an image of the camera module in a zooming process, and a requirement on position precision of the second optical assembly 15 is relatively high. In this implementation, the second position sensor 17 is fixedly connected to the second optical assembly 15, helping improve position detection precision of the second optical assembly 15, implementing more accurate position detection, and ensuring higher efficiency of adjusting image sharpness.

In the second piezo assembly 19, the second stator 194, the second adapter 195, and the second power supply element 196 are fixedly connected to form at least a part of the driving assembly. Structures of the second stator 194, the second adapter 195, and the second power supply element 196 are the same as those of the first stator 184, the first adapter 185, and the first power supply element 186. The second driven element 193 and the first driven element 183 are located on the same side of the first optical assembly 14 and the second optical assembly 15. Similarly, the driving assembly in the second piezo assembly 19 and the driving assembly in the first piezo assembly 18 are also located on the same side of the first optical assembly 14 and the second optical assembly 15.

The external connector 1961 of the second power supply element 196 also extends out of the base 11 and the housing 12, and is configured to connect to a circuit on the main board of the mobile terminal. The external connector 1861 of the first power supply element 186 and the external connector 1961 of the second power supply element 196 extend out of the camera module 10 from the same side of the base 11 and the housing 12, and may be electrically connected between the external connector and the circuit on the main board by using an FPC or another electrical connection cable, so as to supply power to the camera module 10.

In an implementation, a controller is disposed on the main board, and the controller is electrically connected to the first power supply element 186 and the second power supply element 196 to provide a high frequency power signal (approximately 100-800 kHz) for the camera module 10. Under excitation of the high frequency power signal, the first piezo element of the first stator 184 generates elastic vibration, and the vibration is amplified by the first cantilever, and the first driven element 183 is driven to move, so that the first optical assembly 14 moves along the optical axis to zoom the camera module 10. In the zooming process, the second piezo element of the second stator 194 generates elastic vibration by supplying power to the second power supply element 196, the elastic vibration is amplified by the second cantilever of the second fixing element, and the second driven element 193 together with the second optical assembly 15 is driven to move, thereby adjusting the image so that the image always remains clear in the zooming process.

During the movement of the first optical assembly 14, the first position sensor 16 and the position element 182 move relatively, the magnetic field on the surface of the first position sensor 16 changes with the relative motion, and the first position sensor 16 generates a corresponding current with the change of the magnetic field. A control circuit on the main board of the mobile terminal determines the moving distance and the position of the first optical assembly 14 based on a magnitude of the current. During the movement of the second optical assembly 15, a relative position exists between the second optical assembly 15 and the first optical assembly 14, that is, relative motion occurs between the position element 182 and the second position sensor 17, a magnetic field on a surface of the second position sensor 17 changes with the relative motion, and the second position sensor 17 generates a corresponding current with the change of the magnetic field. The control circuit on the main board of the mobile terminal determines the moving distance and the position of the second optical assembly 15 based on a magnitude of the current. Based on effects of the first piezo assembly 18 and the second piezo assembly on the first optical assembly 14 and the second optical assembly 15, and in combination with the arrangement of the first position sensor 16 and the second position sensor 17, in this application, the two optical assemblies in the optical system are configured to move linearly along the path given by the optical design, to change the combined focal length of the overall optical system while keeping the position of the image plane unchanged, and always keeping the image clear during continuous zooming.

In this implementation, the first stator 184 and the second stator 194 are disposed on the same side of the first optical assembly 14 and the second optical assembly 15, so that mutually independent translational motion of the first optical assembly 14 and the second optical assembly 15 can be implemented, and functions of continuous zooming and image adjustment of the camera module 10 are implemented. The first stator 184 and the second stator 194 are located on the same side of the first optical assembly 14 and the second optical assembly 15, facilitating arrangement of power supply wiring of the camera module 10. The first stator 184 and the second stator 194 are fixedly connected to the base 11, the first stator 184 and the second stator 194 are electrically connected to a circuit on a main board of a mobile terminal by using an FPC, and the arrangement architecture in which the first stator 184 and the second stator 194 are disposed on the same side of the first optical assembly 14 and the second optical assembly 15 further helps reduce a risk of fatigue or fracture of the FPC. In this implementation, the first piezo element of the first stator 184 and the second piezo element of the second stator 194 are used as source power for controlling the movement of the first optical assembly 14 and the second optical assembly 15, providing advantages of a light weight and a small volume. In addition, the material of the piezo element does not cause electromagnetic interference to other elements in the mobile terminal.

Figure 11:
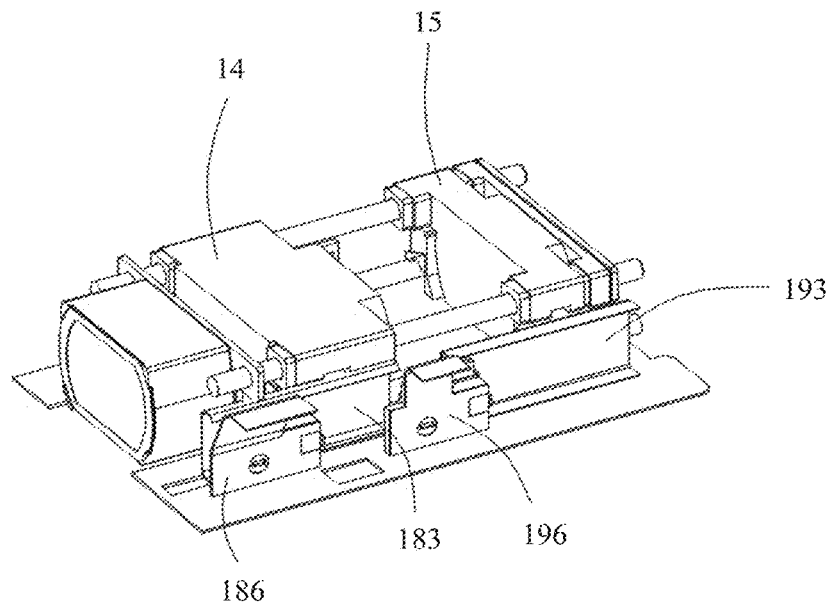
FIG. 11 is a schematic diagram of assembling a camera module excluding a base and a housing according to Embodiment 1.
Figure 12:
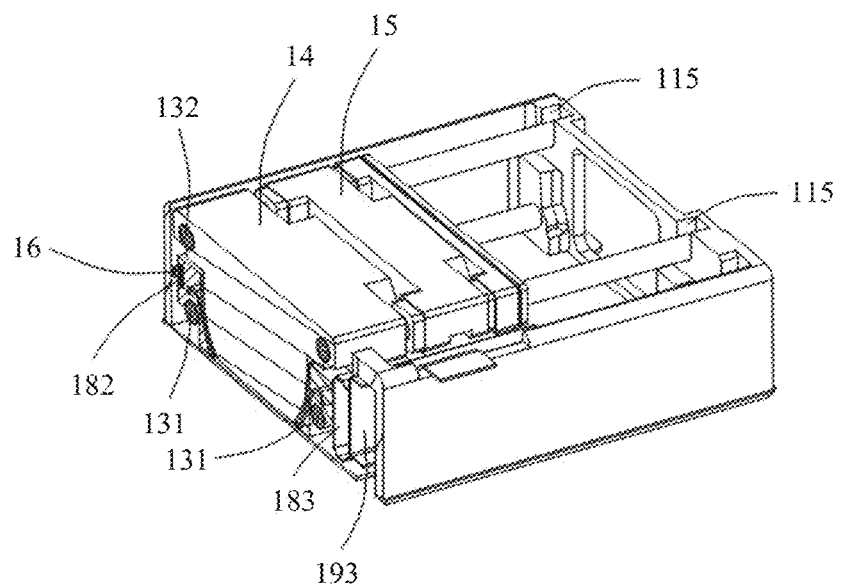
FIG. 12 is a schematic three-dimensional diagram of a camera module in a state according to Embodiment 1.
Figure 13:
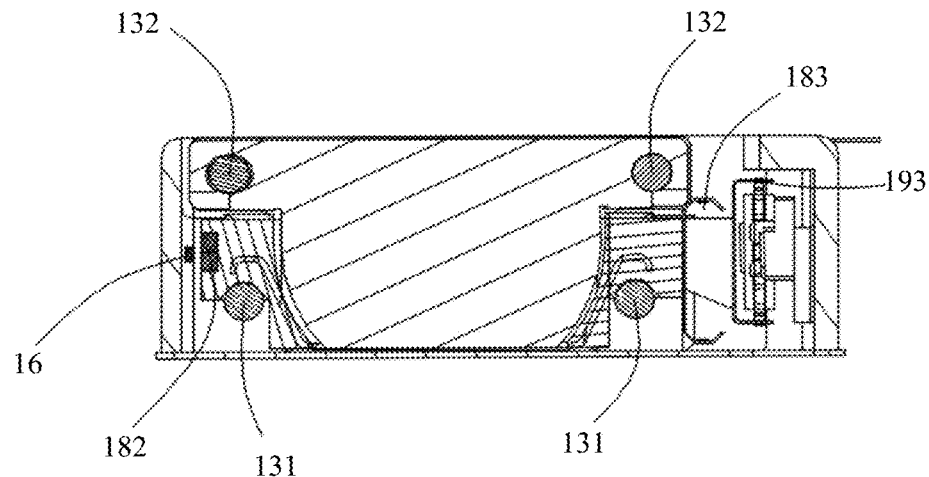
FIG. 13 is a schematic cross-sectional view of FIG. 12.

Refer to FIG. 11, FIG. 12, and FIG. 13. In this implementation, because the first stator 184 and the second stator 194 are located on the same side of the first optical assembly 14 and the second optical assembly 15, to maximize the stroke of the first optical assembly 14 and the second optical assembly 15, the first driven element 183 and the second driven element 193 are staggered in the extension direction of the optical axis, that is, the second driven element 193 and the first driven element 183 are parallel to each other and there is a specific overlapping region between the second driven element 193 and the first driven element 183. This can ensure that the second driven element 193 and the first driven element 183 do not collide or interfere during the motion, because their trajectories are also parallel to each other. In the camera module 10, the movement of the first driven element 183 and the second driven element 193 can achieve a long stroke of at least 7 mm. FIG. 10 and FIG. 11 are schematic diagrams of the camera module in two different position states. On a cross section perpendicular to the optical axis (a position of the cross section shown in FIG. 12), the second driven element 193 is located between the first driven element 183 and the side plate of the base; and the second driven element 193 and the first driven element 183 are disposed in parallel, and their heights from the bottom plate may be different or the same.

In this implementation, the first position sensor 16 and the second position sensor 17 are disposed on the side of the first optical assembly 14 and the second optical assembly 15 that faces away from the first stator 184 and the second stator 194. In another implementation, the first position sensor 16 and the second position sensor 17 as well as the first stator 184 and the second stator 194 may alternatively be disposed on the same side of the first optical assembly 14 and the second optical assembly 15. The first position sensor 16 and a position element that cooperates with the first position sensor 16 to detect a position may be disposed in a region between the bottom plate of the base and the first stator and the first driven element. Similarly, the second position sensor 17 may alternatively be disposed in a region between the second driven element and the bottom plate.

In this application, the second position sensor 17 is disposed on the second optical assembly 15 to ensure the position detection precision of the second optical assembly 15. Because the process of moving the second optical assembly 15 is intended to adjust the sharpness of the image, the high position detection precision of the second optical assembly 15 can ensure timeliness of image adjustment in the zooming process, thereby ensuring that the image is always clear in the zooming process.

In an implementation, the first adapter 185 may provide an elastic pre-stress to ensure contact between the first cantilever of the first stator 184 and the contact region 1832 of the first driven element 183. It may be understood that the first adapter 185 may include a spring plate, and the spring plate applies an elastic force to the first cantilever, so that in the process in which the first cantilever comes into contact with the contact region 1832 of the first driven element 183, under action of the elastic pre-stress of the elastic sheet, the direction of the elastic pre-stress faces toward the contact region 1832 of the first driven element 183. This ensures that vibration of the first cantilever of the first stator 184 can drive the first driven element 183 to move.

In another implementation, the elastic pre-stress against the first cantilever of the first stator 184 and the second cantilever of the second stator 194 may alternatively be formed through structural design of the first driven element 183 and the second driven element 193. The first driven element 183 is used as an example for description. The structure of the second driven element 193 may be the same as that of the first driven element 183.

Figure 14:
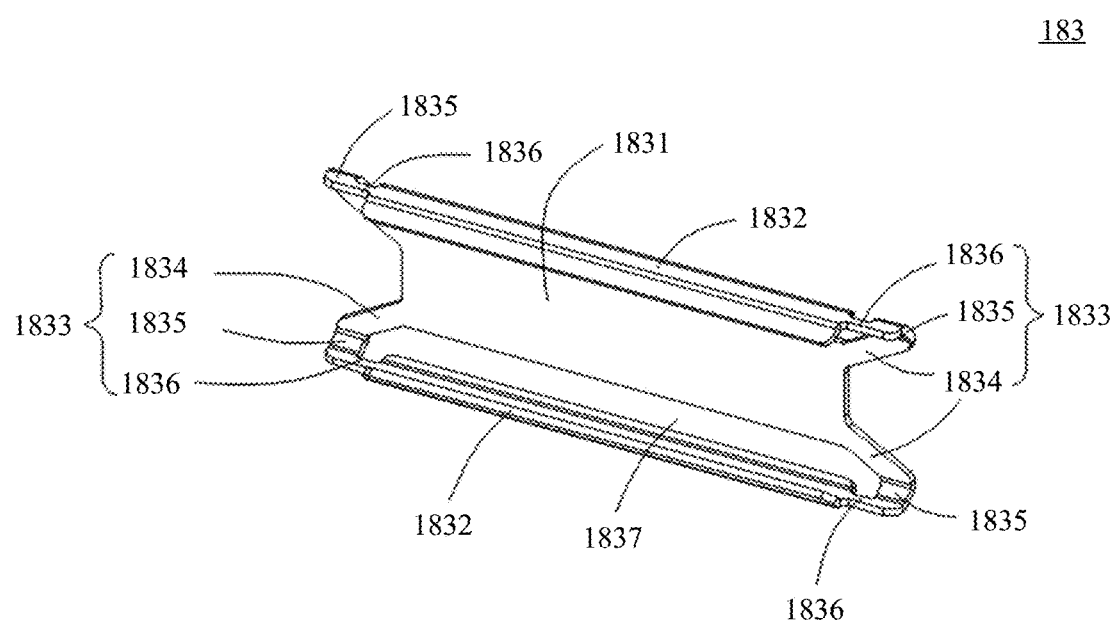
FIG. 14 is a three-dimensional diagram of a first driven element of a camera module according to Embodiment 1.
Figure 15:
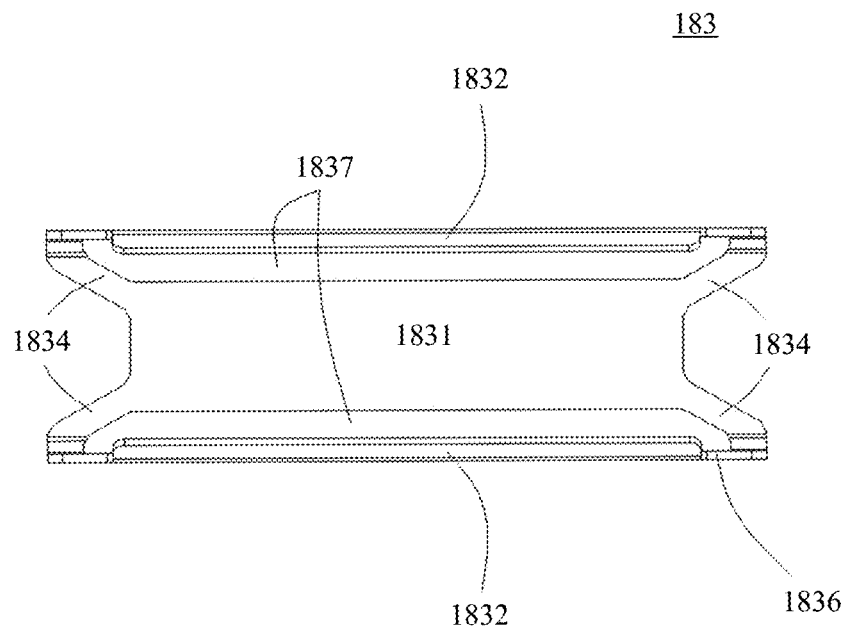
FIG. 15 is a plan view of a first driven element provided in FIG. 14.
Figure 16:
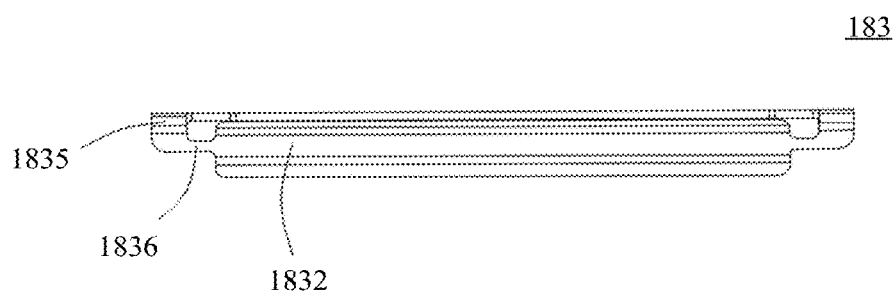
FIG. 16 is another plan view of a first driven element provided in FIG. 14.

Refer to FIG. 14, FIG. 15, and FIG. 16. The first driven element 183 includes a fixing region 1831 located in a central region, and contact regions 1832 symmetrically disposed on two opposite sides of the fixing region 1831. Grooves are formed on both of the two contact regions 1832, openings of the two grooves are opposite to each other, and extension directions of the two grooves are in parallel. The contact region 1832 is used to provide guidance during the movement, and a groove of the contact region 1832 is equivalent to a guiding track. A hollow region 1837 is formed between the contact region 1832 and the fixing region 1831, and two ends of the contact region 1832 are separately connected to the fixing region 1831 by using a connection region 1833. Specifically, the fixing region 1831 is substantially rectangular, and four connection regions 1833 are respectively located at four corner positions of the fixing region 1831. Each connection region 1833 includes a first connection segment 1834, a second connection segment 1835, and a third connection segment 1836 that are successively connected between the fixing region 1831 and the contact region 1832.

The four first connection segments 1834 are used to provide disturbance in the motion direction of the first driven element 183 in the motion process. Because the fixing region 1831 is fixedly connected to the first optical assembly 14, in the process in which the first stator drives the first driven element to move, the first optical assembly 14 may bring an external force to the first driven element that hinders movement of the first driven element. The first connection segment 1834 is of a metal strip structure, and its material itself has an elastic deformation capability, which may also be understood as a buffer force. Therefore, the first connection segments 1834 are distributed around the fixing region 1831, thereby providing disturbance of the contact region 1832 in all directions. The disturbance may be understood as a deviation or vibration.

Based on the design of the contact region 1832 and the third connection segment 1836, a pre-stress of the first driven element on the first cantilever on the first stator can be provided, so that the first cantilever receives a specific elastic resistance force and can drive the first driven element to move. Specifically, a vertical distance between the two contact regions 1832 is set based on a specific size of a free end of the first cantilever of the first stator. It is necessary to ensure that when the free end of the first cantilever extends into the groove and abuts against the contact region 1832, the first cantilever provides an opening force for the contact region, and the contact region provides a pre-stress for the first cantilever, provided that a distance between the contact region and the center of the first stator is less than a distance between the free end of the first cantilever and the center of the first stator. The third connection segment 1836 is a relatively narrow connection segment connected between the second connection segment 1835 and the contact region 1832, and has a better elastic deformation capability than the second connection segment 1834 and the contact region. The third connection segment 1836 is arranged so that the first cantilever is in contact with the contact region 1832. The third connection segment 1836 receives a pre-stress of the contact region 1832, but does not affect the vibration of the first cantilever. The first cantilever can just perform elliptic motion on the surface of the contact region 1832, so as to push the first driven element to move. Rigidity of the second connection segment 1835 is greater than rigidity of the third connection segment, and the four second connection segments 1835 are located at the four corners of the first driven element 183. The rigidity of the second connection segment 1835 can ensure that the structure of the second driven element is stable and is not easy to deform.

Embodiment 2

Figure 17:
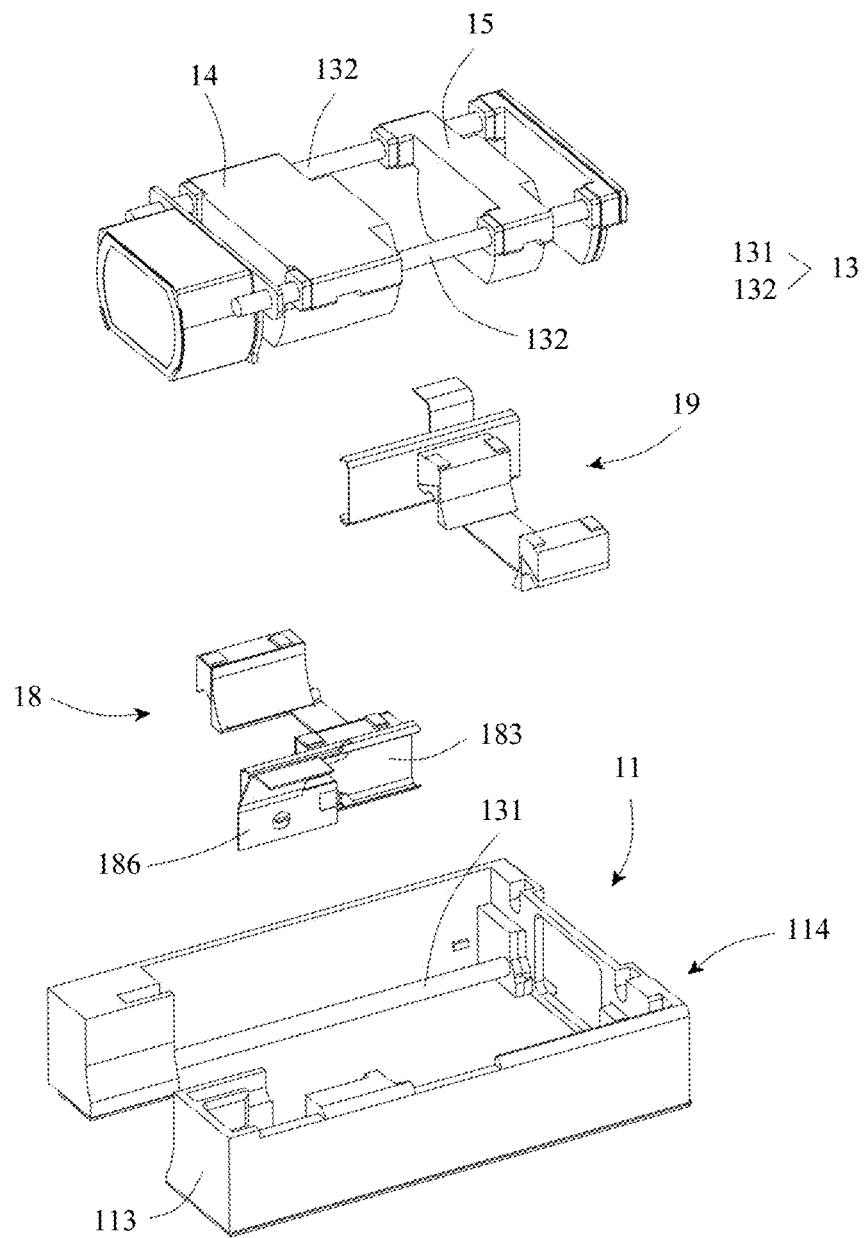
FIG. 17 is a three-dimensional exploded view of a camera module according to Embodiment 2.
Figure 18:
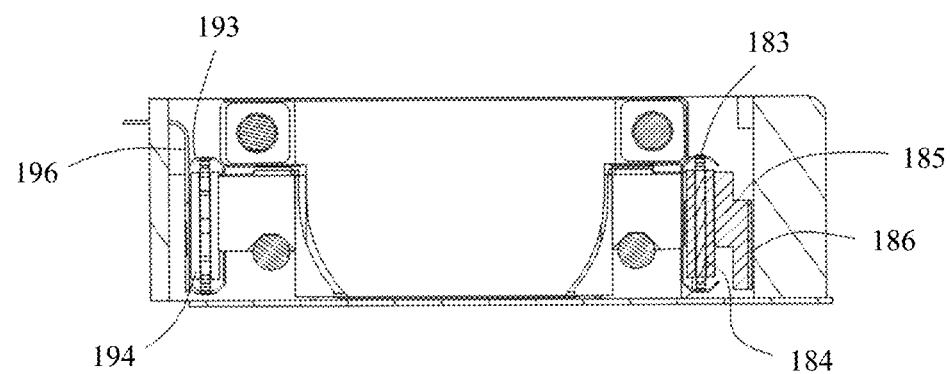
FIG. 18 is a sectional view of a camera module according to Embodiment 2.

Refer to FIG. 17 and FIG. 18. In this implementation, structures of a base 11 and a housing (not shown) of a camera module 10 are substantially the same as the structures in Embodiment 1, and a difference lies in that two notches disposed at a position at which the housing and the base 11 are connected are not on the same side of the base 11. Instead, the two notches are distributed on two sides of the base 11, and in the direction perpendicular to the optical axis and the side plate 112 of the base 11, positions of the two notches are staggered, that is, the two notches are not in a positive relationship.

In this implementation, guide shafts 13 (including a first shaft 131 and a second shaft 132), a first optical assembly 14, and a second optical assembly 15 of the camera module are disposed the same as those in Embodiment 1. A main difference between this implementation and Embodiment 1 lies in that, in this implementation, a first driven element 183, a first stator 184, a first adapter 185, and a first power supply element 186 of a first piezo assembly 18 are disposed on one side of the first optical assembly 14 and the second optical assembly 15. A second driven element 193, a second stator 194, a second adapter (not shown, and the second adapter may not be disposed), and a second power supply element 196 of a second piezo assembly 19 are disposed on the other side of the first optical assembly 14 and the second optical assembly 15, that is, the first stator 184 and the second stator 194 are arranged on two sides of the first optical assembly 14 and the second optical assembly 15, respectively. In the direction perpendicular to the optical axis and the side plate 112 of the base 11, positions of the first stator 184 and the second stator 194 are arranged in a staggered manner corresponding to positions of the two notches (not shown), respectively. An external connector of the first power supply element 186 of the first piezo assembly 18 extends out of the base 11 from one notch, and an external connector of the second power supply element 196 of the second piezo assembly 19 extends out of the base 11 from the other notch. For a specific structure of the notch, refer to Embodiment 1. Alternatively, the notch may be of another structure. For example, a through hole is provided on a side plate, or a through hole is provided on a bottom plate, provided that the external connector can be led out of the base.

In this implementation, mutually independent translational motion of the first optical assembly 14 and the second optical assembly 15 can also be implemented, and functions of continuous zooming and image adjustment of the camera module 10 are implemented. The first stator 184 and the second stator 194 are arranged on two sides of the first optical assembly 14 and the second optical assembly 15, respectively, so that the first piezo assembly 18 and the second piezo assembly 19 have relatively large assembly space, and structures of the first piezo assembly 18 and the second piezo assembly 19 are independent of each other without interference. In Embodiment 1, to ensure that the first driven element 183 and the second driven element 193 do not interfere in a movement process, they need to be disposed in parallel and partially overlapped in terms of space, so as to obtain a relatively large moving stroke. However, in this implementation, the first driven element 183 and the second driven element 193 are not on the same side of the optical assembly, and their layouts are independent of each other, which is convenient from the perspective of structural design and assembly.

To reduce the movement space occupied by the first driven element 183 and the second driven element 193 during movement, in a possible implementation, the first stator 184 and the second stator 194 are respectively fixed to middle regions of a pair of side plates 112 on the base 11, where the middle region is a region on the side plate 112 whose distances from the front end face 113 and the rear end face 114 are equal. Specifically, a middle section of the base 11 is found before the first stator and the second stator are disposed. The middle section is a plane located between the front end face 113 and the rear end face 114 of the base 11 and is parallel to the front end face 113 and the rear end face 114. The first stator 184 and the second stator 194 are fixed at the position of the side plate 112 corresponding to the middle section, and the first stator 184 and the second stator 194 are disposed oppositely.

Because the driven elements (that is, the first driven element and the second driven element) are relatively long, the stators (the first stator 184 and the second stator 194) are placed at an intermediate position (the middle section of the module), thereby reducing motion space occupied by the driven elements when they move.

Settings of the position sensor and the position element in the camera module provided in this implementation may be the same as those in Embodiment 1.

Embodiment 3

Figure 19:
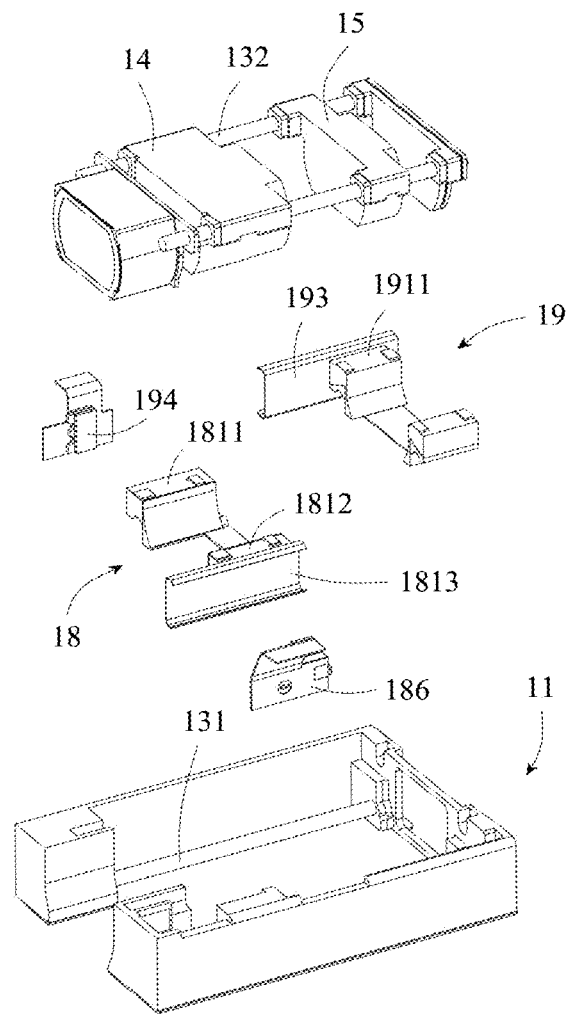
FIG. 19 is a three-dimensional exploded view of a camera module according to Embodiment 3.

Refer to FIG. 19. In this implementation, structures of a base 11 and a housing (not shown) of a camera module 10 are more similar to the structures in Embodiment 2, and two notches disposed at a position at which the housing and the base 11 are connected are also distributed on two sides of the base 11. A difference between this implementation and Embodiment 2 lies in that, a size of one notch extending along the optical axis is greater than a size of the other notch extending along the optical axis, and the notch with the larger size needs to meet a requirement that an external connector can move synchronously in the notch along with the optical assembly. An external connector accommodated in the notch with the smaller size does not move with the optical assembly.

In this implementation, guide shafts 13 (including a first shaft 131 and a second shaft 132), a first optical assembly 14, and a second optical assembly 15 are disposed the same as those in Embodiment 2. In addition to differences in the arrangement of the notches on the base 11 and the housing, a further difference between this implementation and Embodiment 2 is as follows: In this implementation, a first driven element 183, a first stator (not shown, blocked by a first power supply element 186, not shown), a first adapter (not shown, blocked by the first power supply element 186, not shown), and the first power supply element 186 of the first piezo assembly 18 are disposed on one side of the first optical assembly 14 and the second optical assembly 15. The first stator is fixed to the base 11 by using the first adapter and the first power supply element 186. The first driven element 183 is fixed to a second body 1812 of a first holder on one side of the first optical assembly 14. For specific structures of the first stator, the first adapter, and the first power supply element, refer to the structures of the first stator, the first adapter, and the first power supply element in Embodiment 1. A second driven element 193, a second stator 194, a second adapter (not shown, and the second adapter may not be disposed), and a second power supply element 196 of the second piezo assembly 19 are disposed on the other side of the first optical assembly 14 and the second optical assembly 15. In this implementation, the second stator 194 is fixed to the first optical assembly 14, specifically fixedly connected to the first body 1811 of the first holder. Therefore, the second adapter may not be disposed, and the second stator 194 is directly fixed to the first body 1811. The second driven element 193 is fixed to a first body 1911 of a second holder on the other side of the second optical assembly 15. An external connector of the second power supply element 196 extends out of the base 11 from the notch of a larger size. The first stator 184 and the second stator 194 are respectively located on two sides of the first optical assembly 14, so that relatively large space can be provided for mounting the first stator and the second stator, positions of the first stator and the second stator are independent of each other, and avoidance does not need to be considered in a design and assembly process, thereby improving manufacturing efficiency and reducing design difficulty.

In a process in which the first power supply element 186 receives a current, so that the first stator 184 generates vibration and drives the first driven element 183 and the first optical assembly 14 to move, the second stator 194 moves synchronously with the first optical assembly 14. During movement, the second stator 194 may receive a current and generate vibration, and synchronously drive the second driven element 193 and the second optical assembly 15 to move. In this way, linkage between the first optical assembly 14 and the second optical assembly 15 is implemented, so that the camera module 10 has a relatively good continuous zoom function, and position precision of the second optical assembly 15 relative to the first optical assembly 14 can be improved, thereby improving an imaging effect after zooming.

On the basis of this implementation, the first stator 184 and the second stator 194 may alternatively be disposed on the same side of the first optical assembly 14, provided that the positions of the first driven element 183 and the second stator 194 on the first holder on the side of the first optical assembly 14 do not interfere. In this solution, only one notch needs to be provided on the base 11 and the housing, the external connector of the first power supply element 186 is fixed in the notch, the external connector of the second power supply element 196 is movable in the notch, and the positions of the two external connectors do not interfere.

Settings of the position sensor and the position element in the camera module provided in this implementation may be the same as those in Embodiment 1.

Embodiment 4

Figure 20:
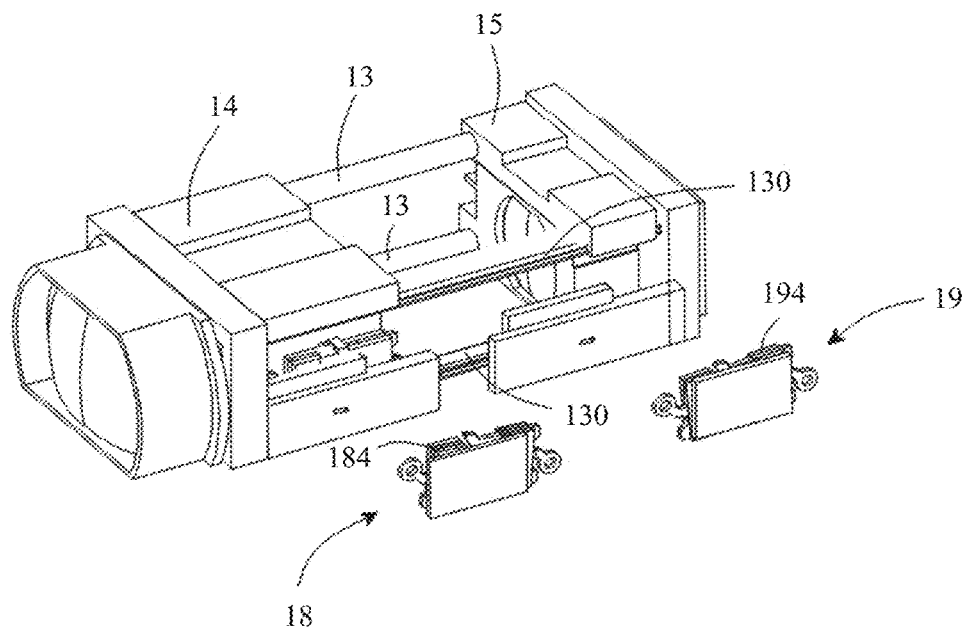
FIG. 20 is an exploded view of a camera module according to Embodiment 4.
Figure 21:
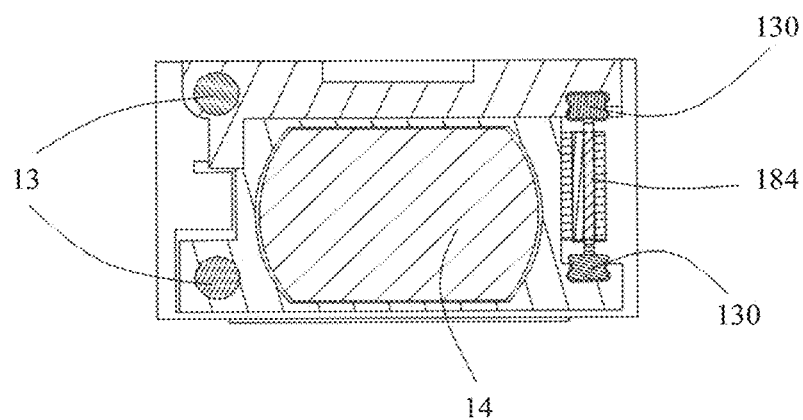
FIG. 21 is a sectional view of a camera module according to Embodiment 4.

Refer to FIG. 20 and FIG. 21. In this implementation, the camera module 10 includes a base (not shown; for a structure of the base, refer to the base structure in Embodiment 1), a first optical assembly 14, a second optical assembly 15, two guide shafts 13, two driven tracks 130, a first piezo assembly 18, and a second piezo assembly 19. The two guide shafts 13 are parallel to each other and both are parallel to the optical axis, and the two driven tracks 130 are parallel to each other and both are parallel to the optical axis. Both the guide shaft 13 and the driven track 130 are fixedly connected to the base. One side of the first optical assembly 14 and the second optical assembly 15 is slidably connected to the two guide shafts 13, and the other side of the first optical assembly 14 and the second optical assembly 15 is slidably connected to the two driven tracks 130. In this implementation, because the first stator 184 and the second stator 194 are fixedly connected to the first optical assembly 14 and the second optical assembly 15, respectively, for structures of the first stator and the first power supply element of the first piezo assembly 18, refer to the structures of the second stator and the second power supply element in Embodiment 3; and for structures of the second stator and the second power supply element in the second piezo assembly 19, still refer to the structures of the second stator and the second power supply element in Embodiment 3. Unlike the previous embodiments, in this embodiment, the first piezo assembly 18 and the second piezo assembly 19 do not include a driven element, but cooperate with the first stator 184 and the second stator 194 by using the driven track 130 as a driven element. In this way, stability of movement of the first optical assembly 14 and the second optical assembly 15 can be improved. In addition, the driven track 130 has functions of both a movable track and a driven element, thereby effectively saving accommodating space of the camera module, and facilitating development of the camera module with a small volume and a light weight. In this implementation, the first piezo assembly 18 is fixedly connected to the first optical assembly 14 to move together with the first optical assembly 14, and the second piezo assembly 19 is fixedly connected to the second optical assembly 15 to move together with the second optical assembly 15. The first piezo assembly 18 and the second piezo assembly may be disposed on the same side of the first optical assembly 14 and the second optical assembly 15, and the positions of the two driven tracks are disposed corresponding to the positions of the first piezo assembly 18 and the second piezo assembly 19. The first piezo assembly 18 and the second piezo assembly 19 may alternatively be disposed on two sides of the first optical assembly 14 and the second optical assembly 15, respectively. A working principle of the camera module 10 provided in this embodiment is the same as that in the previous embodiments. The first power supply element receives power from the main board of the mobile terminal, so that the first piezo element in the first stator vibrates, the vibration is amplified by the first cantilever of the first fixing element, and the free end of the first cantilever cooperates with one of the driven tracks 130. Specifically, the driven track 130 is partially embedded into the first optical assembly 14 and the second optical assembly 15, an outer surface that is of the driven track 130 and that is not surrounded by the first optical assembly 14 is provided with a groove, the first cantilever extends into the groove and comes into contact with the driven track 130, and the first cantilever amplifies the vibration. In this way, the free end of the first cantilever is in contact with the driven track 130 and performs elliptic motion, thereby driving the first optical assembly 14 to move relative to the driven track 130. Similarly, the second power supply element receives power from the main board of the mobile terminal, so that the second piezo element of the second stator 194 vibrates, the vibration is amplified by the second cantilever of the second fixing element, and the free end of the second cantilever cooperates with the other driven track 130. Specifically, the driven track 130 is partially embedded into the first optical assembly 14 and the second optical assembly 15, an outer surface that is of the driven track 130 and that is not surrounded by the second optical assembly 15 is provided with a groove (or referred to as a track groove), the second cantilever extends into the groove and comes into contact with the driven track (that is, an inner wall of the groove), and the second cantilever amplifies the vibration. In this way, the free end of the second cantilever is in contact with the driven track and performs elliptic motion, thereby driving the second optical assembly 15 to move relative to the driven track 130. For the fixing manner of the first stator 184 and the first optical assembly 14, refer to the fixing manner of the first stator and the first adapter in Embodiment 1, provided that the first stator 184 and the first optical assembly 14 are relatively fixedly connected, and the piezo element of the first stator 184 is not constrained by another element and can vibrate freely; in other words, a gap needs to be maintained between the first piezo element and the first optical assembly 14. The fixing manner of the second stator 194 and the second optical assembly 15 is the same as the fixing manner of the first stator 184 and the first optical assembly 14.

Settings of the position sensor and the position element in the camera module provided in this implementation may be the same as those in Embodiment 1.

Based on the basic architectures in the foregoing embodiments, the quantity of first stators and the quantity of second stators in the camera module 10 provided in this application each may be one, two, or more. The following describes an architecture of the first stator in a plurality of different possible implementations by using the first stator as an example.

In a first implementation, there is one first stator, and the first stator includes a first fixing element and two first piezo elements fixed on two sides of the first fixing element by adhesive. A structural form of the first stator in this implementation is the same as that of the first stator in Embodiment 1. Refer to FIG. 8. Two first piezo elements are added on the basis of the first fixing element 1844 shown in FIG. 8 to form the first stator in this implementation. The first cantilever 18443 is configured to cooperate with the first driven element or the driven track, and the quantity of fixing parts 18442 is not limited to two, and may be one or more, provided that the first piezo element and the body 18441 of the first fixing element 1844 can be supported on the first adapter, and a gap is formed between the first piezo element and the first adapter. There may be one or more first cantilevers 18443.

Figure 22:
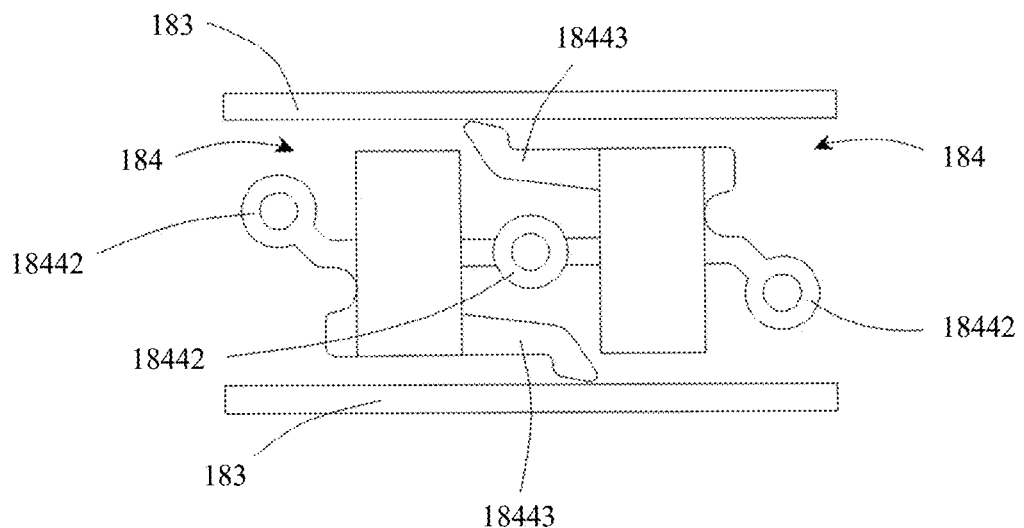
FIG. 22 is a schematic diagram of a first stator in a first piezo module according to an implementation of this application.

In a second implementation, refer to FIG. 22. There are two or more first stators 184, and a basic architecture of each first stator 184 is the same as that of the first stator in the first implementation. Two or more first stators 184 are arranged in a row in the extension direction of the optical axis (specifically, bodies of first fixing elements of all the first stators are coplanar), and fixing parts of first fixing elements of two adjacent first stators 184 overlap. Two first stators 184 are used as an example. Bodies 18441 of first fixing elements 1844 of the two first stators 184 are disposed side by side. One fixing part 18442 of one first stator 184 overlaps one fixing part 18442 of the other first stator 184. Central positions of the two fixing parts 18442 overlapping each other are midpoints of central connection lines of the two first stators 184. It may be understood that the two overlapping fixing parts 18442 are located between the bodies 18441 of the two first fixing elements, and the central positions of the two overlapping fixing parts 18442 have equal vertical distances from the bodies of the two first fixing elements. The first cantilevers of the two first stators are distributed on two sides of the two overlapping fixing parts 18442, and the quantity of contact regions of the first driven element 183 that cooperates with the first cantilevers 18443 is two, and the two contact regions are distributed on two sides of the first stator 184 to respectively cooperate with the first cantilevers 18443.

Figure 23:
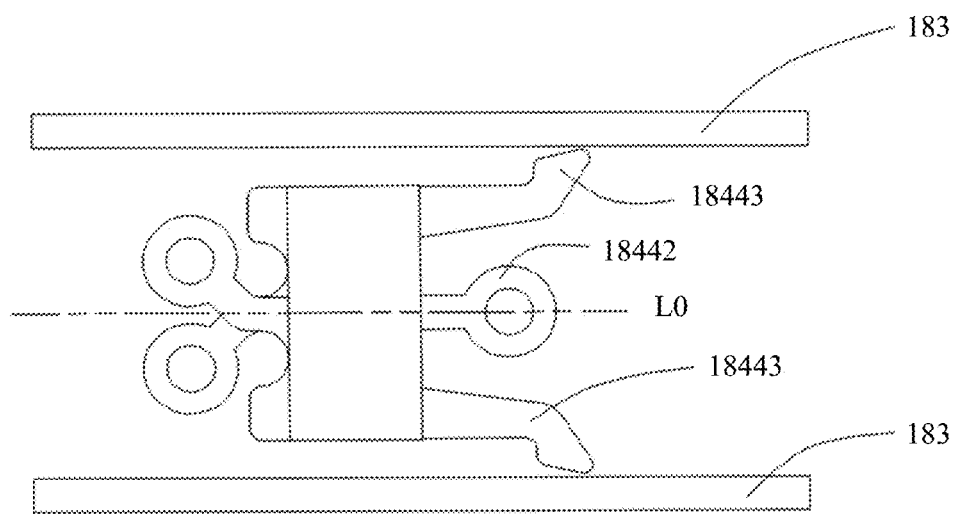
FIG. 23 is a schematic diagram of a first stator in a first piezo module according to another implementation of this application.

In a third implementation, refer to FIG. 23. There are two or more first stators 184, and a basic architecture of each first stator 184 is the same as that of the first stator in the first implementation. The two or more first stators 184 are disposed in an overlapping manner (specifically, on the cross section of the camera module perpendicular to the optical axis, the bodies of all the first fixing elements and the first piezo elements are disposed in an overlapping manner). One fixing part 18442 of one first stator 184 and one fixing part 18442 of the other first stator 184 overlap, and are located on one side of the two bodies disposed in an overlapping manner, and the other two fixing parts 18442 of these two first stators 184 are disposed side by side on the other side of the bodies. The central positions of the two fixing parts overlapping each other fall on one center line L0 of the body, and the first cantilevers 18443 of the two first stators are respectively disposed on two sides of the center line L0. As shown in FIG. 23, the two first cantilevers 18443 are respectively located on an upper part and a lower part of the body, and the fixing parts 18442 are distributed on the left and right sides of the body. The quantity of contact regions of the first driven element 183 that cooperates with the two first cantilevers is the same as the quantity of the first cantilevers 18443, and the contact regions are distributed on two sides of the first stator to respectively cooperate with the first cantilevers 18443.

Figure 24:
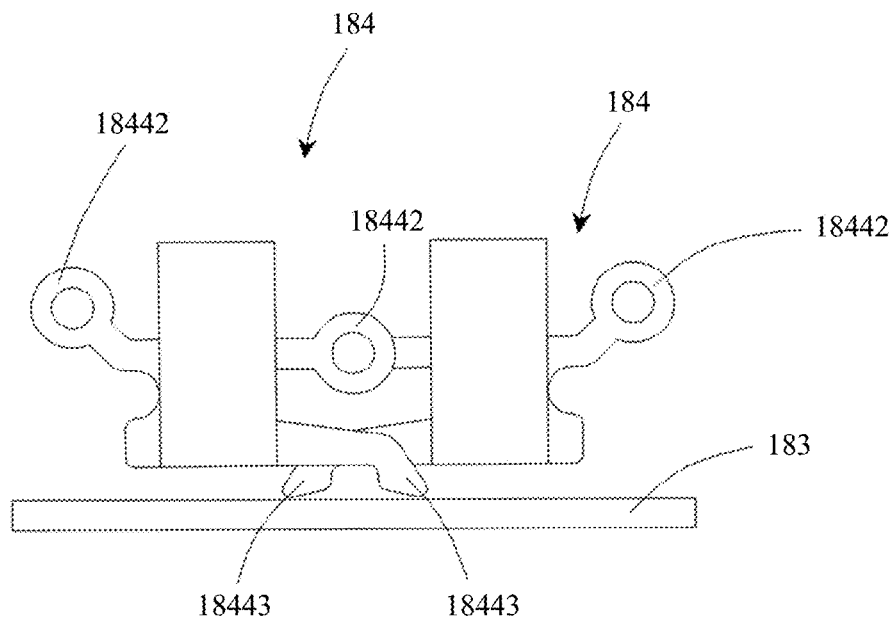
FIG. 24 is a schematic diagram of a first stator in a first piezo module according to still another implementation of this application.

In a fourth implementation, refer to FIG. 24. There are two first stators 184, a basic architecture of each first stator 184 is the same as that of the first stator in the first implementation, and bodies of the two first stators 184 are disposed side by side. One fixing part 18442 of one first stator 184 and one fixing part 18442 of the other first stator 184 overlap, central positions of the two fixing parts 18442 overlapping each other are midpoints of central connection lines of the two first stators 184, and the first cantilevers 18443 of the two first stators 184 are distributed on the same side of the centers of the two first stators 184. As shown in FIG. 24, the first cantilevers 18443 of the two first stators 184 are both located on a lower part of the body, and the two first cantilevers 18443 jointly cooperate with one contact region of the first driven element 183. Therefore, the quantity of contact regions of the first driven element 183 is one, and the contact region is distributed on one side of the first stator 184.

Figure 25:
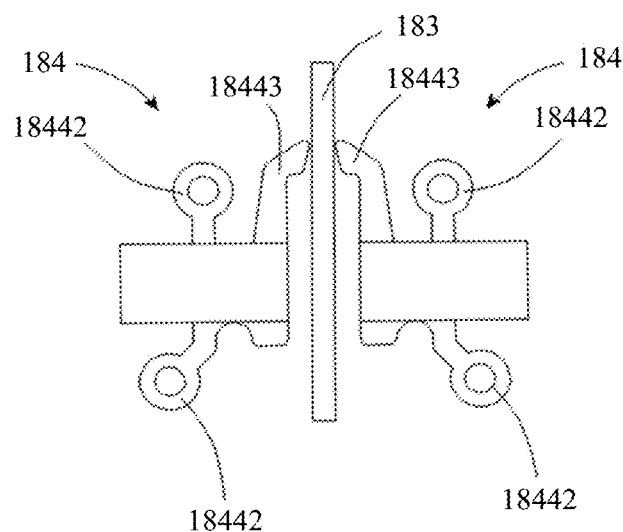
FIG. 25 is a schematic diagram of a first stator in a first piezo module according to yet another implementation of this application.

In a fifth implementation, refer to FIG. 25. There are two first stators 184, a basic architecture of each first stator 184 is the same as that of the first stator in the first implementation, and bodies of the two first stators 184 are disposed side by side. In addition, contact regions of the first driven element 183 are located between the two first stators 184, the two first stators 184 are symmetrically distributed on two sides of the contact regions of the first driven element 183, and the first cantilevers 18443 of the two first stators 184 are arranged in a mirror with the contact region of the first driven element 183 as the center.

This application is not limited to the structures and layouts of the first stators described in the foregoing five implementations. There may be a plurality of first stators, for example, bodies of the plurality of first stators are disposed side by side or disposed in an overlapping manner. There may be one or more first cantilevers in each first stator.

The camera module provided in the embodiments of this application is described above in detail. The principle and embodiments of this application are described herein through specific examples. The description about the embodiments of this application is merely provided to help understand the method and core ideas of this application. In addition, persons of ordinary skill in the art can make variations and modifications to this application in terms of the specific embodiments and application scopes according to the ideas of this application. Therefore, the content of specification shall not be construed as a limit to this application.

What is claimed is:

1. A camera module, comprising a base, a guide shaft, a first piezo assembly, a second piezo assembly, a first optical assembly, and a second optical assembly, wherein the first optical assembly and the second optical assembly are successively slidable in an optical axis direction on the guide shaft, wherein the guide shaft is fixedly connected to the base; the first piezo assembly comprises a first interior surface and a second interior surface that is diametrically opposed to the first interior surface, the first interior surface and the second interior surface co-operatively define an accommodating space, the first optical assembly is disposed within the accommodating space, the first piezo assembly comprises a first stator and a first driven element, the first stator comprises a first piezo element and a first fixing element that are fixedly connected, the first fixing element comprises a first cantilever, and the first cantilever is configured to amplify vibration generated by the first piezo element in an energized state and to cooperate with the first driven element to drive the first optical assembly to slide on the guide shaft; the second piezo assembly is connected between the base and the second optical assembly or between the first optical assembly and the second optical assembly, the second piezo assembly comprises a second stator and a second driven element, the second stator comprises a second piezo element and a second fixing element that are fixedly connected, the second fixing element comprises a second cantilever, and the second cantilever is configured to amplify vibration generated by the second piezo element in an energized state and to cooperate with the second driven element to drive the second optical assembly to slide on the guide shaft.

2. The camera module according to claim 1, wherein the first driven element is fixed to the first optical assembly, the second driven element is fixed to the second optical assembly, the first stator and the second stator are both fixed to the base, and the first stator and the second stator are distributed on a same side of the first optical assembly and the second optical assembly.

3. The camera module according to claim 2, wherein extension directions of both the first driven element and the second driven element are aligned with an extension direction of the optical axis, and the first driven element and the second driven element partially overlap.

4. The camera module according to claim 1, wherein the first driven element is fixed to the first optical assembly, the second driven element is fixed to the second optical assembly, the first stator and the second stator are both fixed to the base, and the first stator and the second stator are distributed on two sides of the first optical assembly and the second optical assembly.

5. The camera module according to claim 4, wherein the base comprises a pair of side plates disposed oppositely, the base comprises a front end face for mounting a lens and a rear end face for mounting an image sensor, the pair of side plates extends between the front end face and the rear end face, and the first stator and the second stator are respectively fixed to a middle region of the pair of side plates, wherein the middle region is a region on the side plate having equal distances from a front end and a rear end.

6. The camera module according to claim 1, wherein the first driven element is fixed to the first optical assembly, the first stator is fixed to the base, the second driven element is fixed to the second optical assembly, and the second stator is fixed to the first optical assembly.

7. The camera module according to claim 6, wherein the first stator and the second stator are respectively located on two sides of the first optical assembly.

8. The camera module according to claim 1, wherein the first driven element and the second driven element are fixed to the base, the first driven element and the second driven element are in a track shape, the first optical assembly and the second optical assembly are slidably connected to the first driven element and the second driven element, the first stator is fixed to the first optical assembly, and the second stator is fixed to the second optical assembly.

9. The camera module according to claim 1, wherein the first driven element comprises a fixing region and a contact region forming a hollow region with the fixing region; the fixing region is used to be fixedly connected to the first optical assembly; and the contact region is in contact with the first cantilever and applies a spring driven force to the first cantilever.

10. The camera module according to claim 1, wherein the first piezo assembly further comprises a first adapter and a first power supply element, and the first stator and the first power supply element are respectively fixed to two opposite sides of the first adapter.

11. The camera module according to claim 10, wherein the first fixing element comprises a body, a first fixing piece, a second fixing piece, and the first cantilever; the first piezo element is fixed on both front and back surfaces of the body; both the first fixing piece and the first cantilever extend out of a first side of the body; the second fixing piece extends out of a second side of the body that is diametrically opposed to the first side of the body; the first fixing piece and the second fixing piece fix the first stator to the first adapter, and form a gap between the first piezo element and the first adapter.

12. The camera module according to claim 1, wherein a quantity of the first stators is two or more; in an extension direction of the optical axis, the two or more first stators are arranged in a row; the first driven element comprises contact regions; and the first cantilever is in contact with and cooperates with the contact regions to drive the first driven element to move, wherein a quantity of the contact regions is two and the two contact regions are distributed on two sides of the two or more first stators;

or, wherein a quantity of the first stators is two or more; the first stators are disposed in an overlapping manner, and a quantity of the first cantilevers is equal to or greater than a quantity of the first stators; the first driven element comprises contact regions; and the first cantilever is in contact with and cooperates with the contact regions to drive the first driven element to move, wherein a quantity of the contact regions is two, and the two contact regions are distributed on two sides of the two or more first stators;

or, wherein a quantity of the first stators is two or more; in an extension direction of the optical axis, the two or more first stators are arranged in a row; the first driven element comprises a contact region; and the first cantilever is in contact with and cooperates with the contact region to drive the first driven element to move, wherein a quantity of the contact regions is one, and the contact region is distributed on a same side of the two or more first stators;

or, wherein a quantity of the first stators is two; the first driven element comprises a contact region; and the first cantilever is in contact with and cooperates with the contact region to drive the first driven element to move, wherein a quantity of the contact regions is one, and the two first stators are symmetrically distributed on two sides of the contact region;

or,
wherein the first driven element comprises a fixing region and a contact region forming a hollow region with the fixing region; the fixing region is used to be fixedly connected to the first optical assembly; and the contact region is in contact with the first cantilever and applies a spring driven force to the first cantilever.

13. The camera module according to claim 1, further comprising a first position sensor, a second position sensor, and a position element, wherein the first position sensor is fixed to the base; the position element is fixedly connected to the first optical assembly and is located on a side of the first optical assembly facing the first position sensor; the second position sensor is fixed to the second optical assembly; a moving distance or a position of the first optical assembly is determined through cooperation between the first position sensor and the position element; and a moving distance or a position of the second optical assembly is determined through cooperation between the second position sensor and the position element.

14. A mobile terminal, comprising a controller and a camera module,
wherein the camera module comprises a base, a guide shaft, a first piezo assembly, a second piezo assembly, and a first optical assembly and a second optical assembly that are successively slidably connected to the guide shaft in an optical axis direction, wherein the guide shaft is fixedly connected to the base; the first piezo assembly comprises a first interior surface and a second interior surface that is diametrically opposed to the first interior surface, the first interior surface and the second interior surface co-operatively define an accommodating space, the first optical assembly is disposed within the accommodating space, the first piezo assembly comprises a first stator and a first driven element, the first stator comprises a first piezo element and a first fixing element that are fixedly connected, the first fixing element comprises a first cantilever, and the first cantilever is configured to amplify vibration generated by the first piezo element in an energized state, and cooperate with the first driven element to drive the first optical assembly to slide on the guide shaft; the second piezo assembly is connected between the base and the second optical assembly, or between the first optical assembly and the second optical assembly, the second piezo assembly comprises a second stator and a second driven element, the second stator comprises a second piezo element and a second fixing element that are fixedly connected, the second fixing element comprises a second cantilever, and the second cantilever is configured to amplify vibration generated by the second piezo element in an energized state, and cooperate with the second driven element to drive the second optical assembly to slide on the guide shaft;
wherein the first stator and the second stator are electrically connected to the controller, to supply power to the first piezo element and the second piezo element.

15. The mobile terminal according to claim 14, wherein the first driven element is fixed to the first optical assembly, the second driven element is fixed to the second optical assembly, the first stator and the second stator are both fixed to the base, and the first stator and the second stator are distributed on a same side of the first optical assembly and the second optical assembly.

16. The mobile terminal according to claim 15, wherein extension directions of both the first driven element and the second driven element are aligned with an extension direction of the optical axis, and the first driven element and the second driven element partially overlap.

17. The mobile terminal according to claim 14, wherein the first driven element is fixed to the first optical assembly, the second driven element is fixed to the second optical assembly, the first stator and the second stator are both fixed to the base, and the first stator and the second stator are distributed on two sides of the first optical assembly and the second optical assembly.

18. The mobile terminal according to claim 17, wherein the base comprises a pair of side plates disposed oppositely, the base comprises a front end face for mounting a lens and a rear end face for mounting an image sensor, the pair of side plates extends between the front end face and the rear end face, and the first stator and the second stator are respectively fixed to a middle region of the pair of side plates, wherein the middle region is a region on the side plate having equal distances from a front end and a rear end.

19. The mobile terminal according to claim 14, wherein the first driven element is fixed to the first optical assembly, the first stator is fixed to the base, the second driven element is fixed to the second optical assembly, and the second stator is fixed to the first optical assembly.

20. The mobile terminal according to claim 19, wherein the first stator and the second stator are respectively located on two sides of the first optical assembly.

* * * * *